Jan. 20, 1970  R. W. MILITZER ET AL  3,490,179
HONING MACHINE

Filed March 6, 1967  17 Sheets-Sheet 1

INVENTORS
ROBERT W. MILITZER
ARMAS J. MARTTI
BY

James H. Bower
ATTORNEY

INVENTORS
ROBERT W. MILITZER
ARMAS J. MARTTI
BY
James H. Bower
ATTORNEY

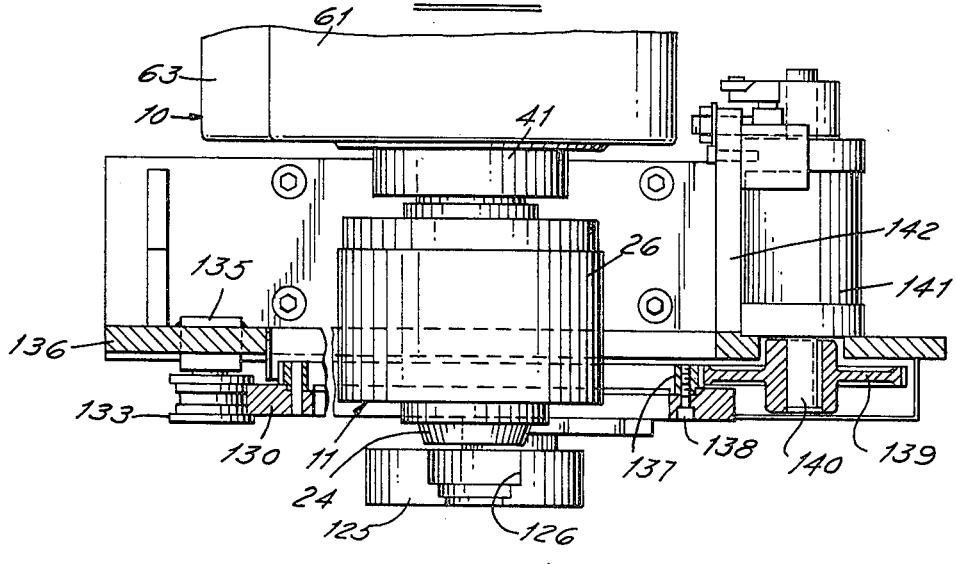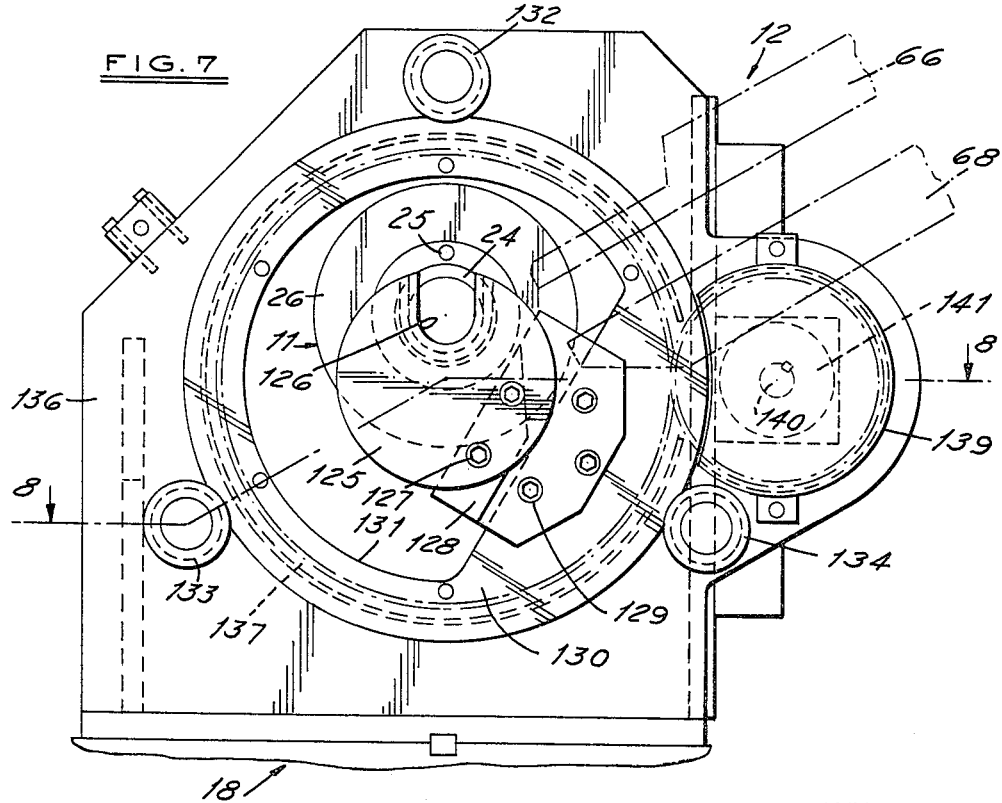

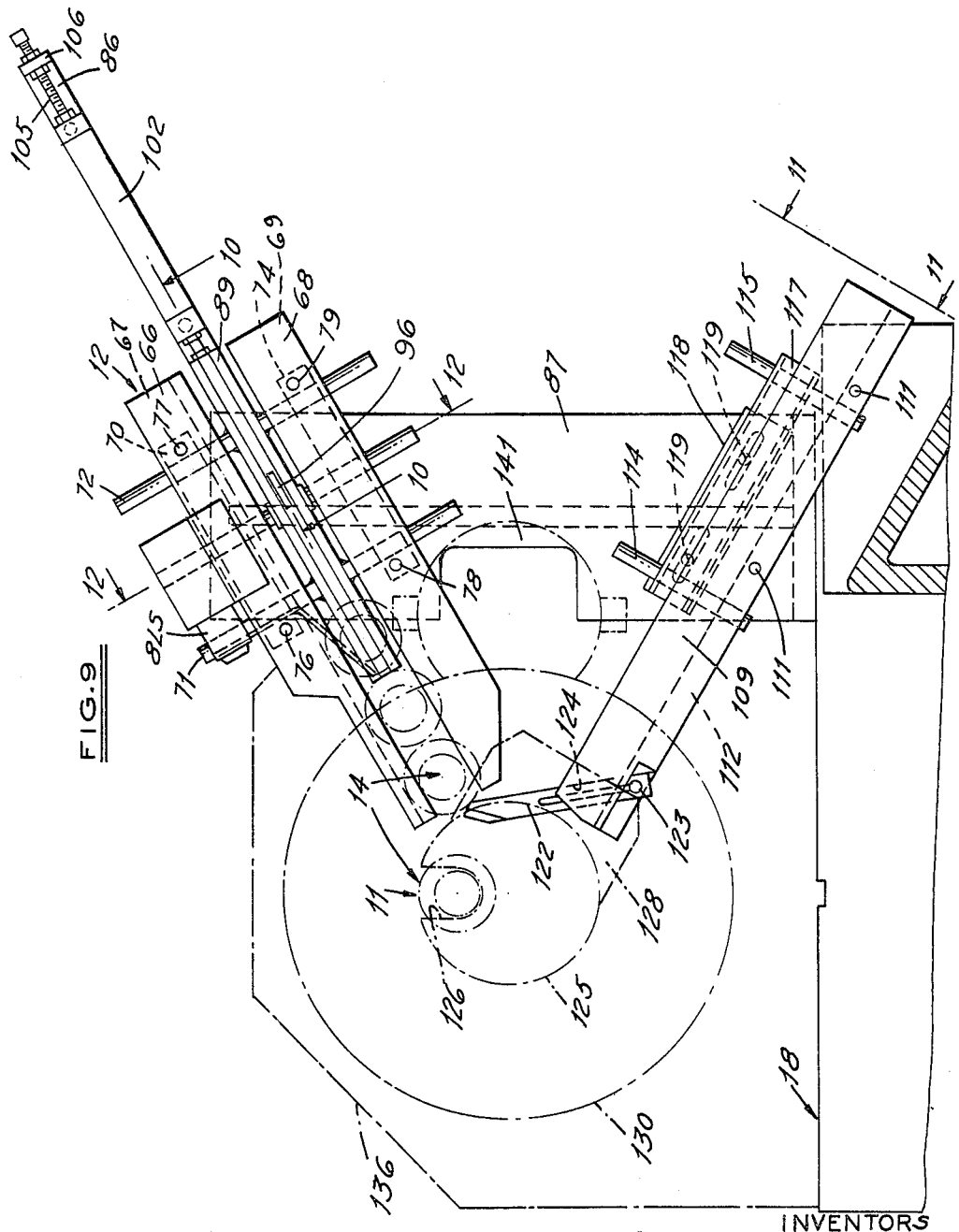

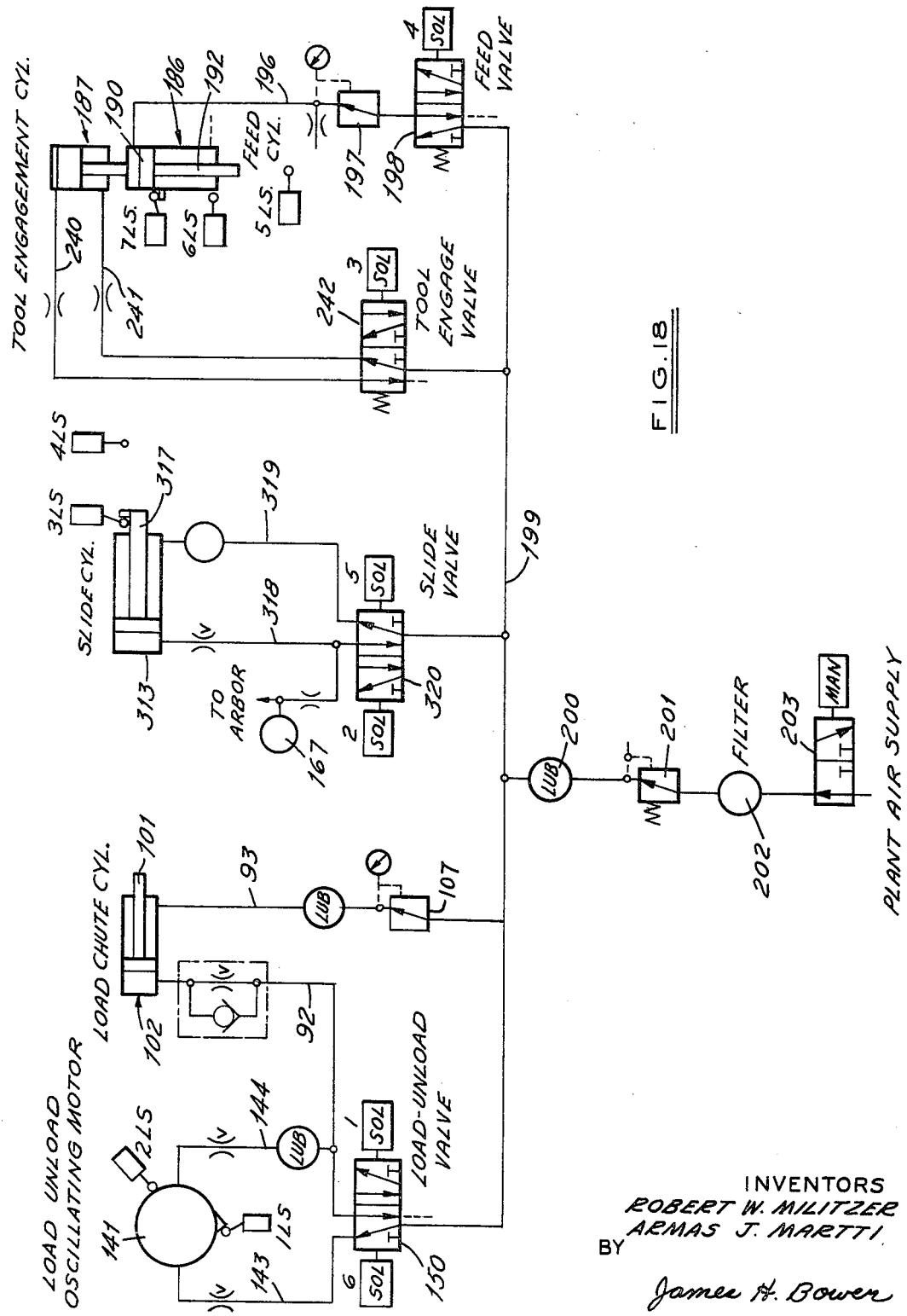

Jan. 20, 1970    R. W. MILITZER ET AL    3,490,179
HONING MACHINE
Filed March 6, 1967    17 Sheets-Sheet 17
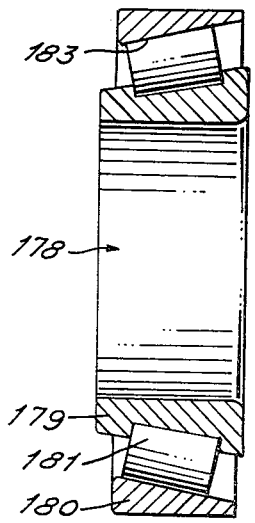
FIG.19
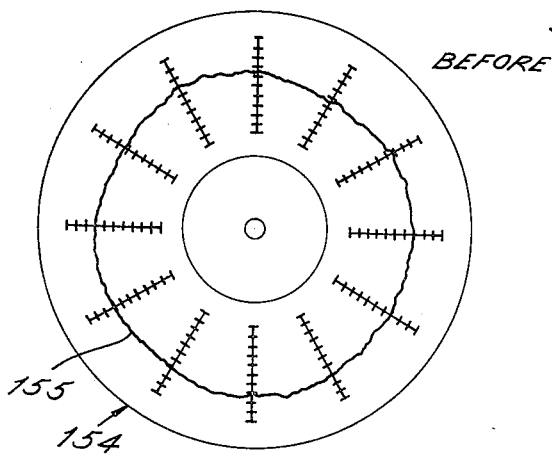
FIG.20
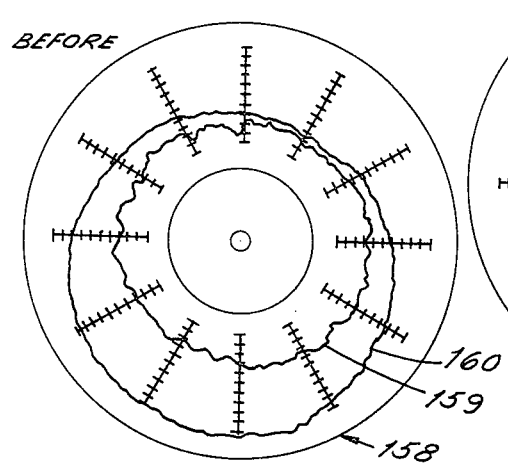
FIG.21
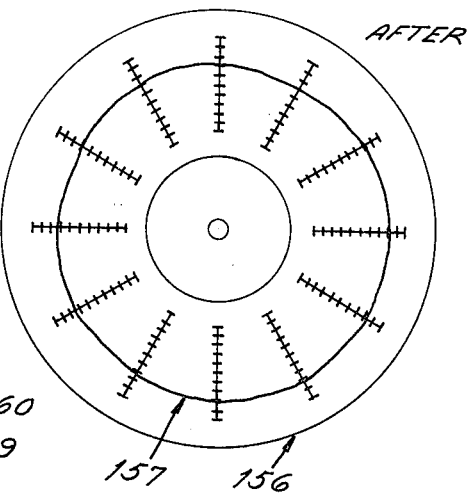
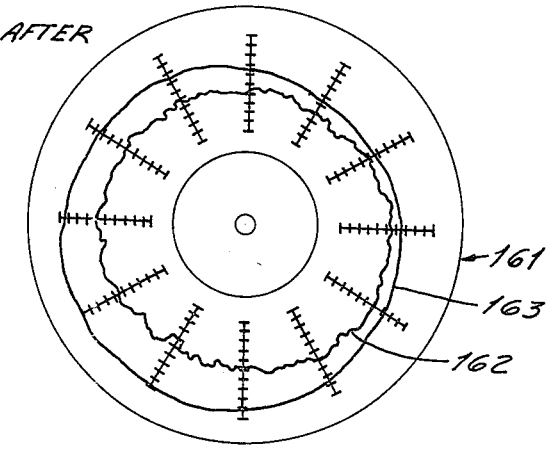
INVENTORS
ROBERT W. MILITZER
ARMAS J. MARTTI
BY
James H. Bower
ATTORNEY United States Patent Office 3,490,179
Patented Jan. 20, 1970

3,490,179
HONING MACHINE
Robert W. Militzer, Huntington Woods, and Armas J. Martti, Detroit, Mich., assignors to Micromatic Hone Corporation, Detroit, Mich.
Filed Mar. 6, 1967, Ser. No. 620,695
Int. Cl. B24b 5/00, 55/02
U.S. Cl. 51—67        20 Claims

ABSTRACT OF THE DISCLOSURE

A honing machine for honing the bearing surface on the cup or cone of a tapered roller bearing, or other tapered parts and straight parts. The workpiece is rotated by a magnetized drive means and is located on an arbor in a centerless relationship to an abrading member which is reciprocated across the bearing surface under the control of a cam stroking mechanism to remove stock efficiently and generate accurate geometric form in relationship to a referenced surface.

SUMMARY OF THE INVENTION

This invention relates generally to the honing art, and more particularly, to a honing machine for honing the bearing surface on the cup or cone of a tapered roller bearing, or other tapered parts and straight parts, at high production rates.

The problems involved in honing the bearing races for ball bearings have heretofore been overcome so that the ball bearing industry has been able to provide ball bearings which have surface finishes on the races that provide optimum quietness in the bearings. Ball bearings are highly competitive with tapered roller bearings for various applications, as for example, for use on the front wheel assemblies of automobiles, use in machine tools, and the like. Ball bearings are adapted to run at higher speeds than tapered roller bearings because of the minimum amount of contact between a bearing ball and the races. However, ball bearings have inherent disadvantages in that they cannot carry the radial loads and the heavy thrust or axial loads which tapered roller bearings are capable of carrying. The bearing races in a tapered roller bearing are ground to provide the desired geometric contour, but the surface grinding operations do not provide a surface finish which is adapted to reduce noise levels to an acceptable level for use on automobile front wheel assemblies, machine tools, and the like.

Heretofore, the bearing industry did attempt to hone the bearing surfaces of tapered roller bearings without success, but it was found that it was not possible to maintain the geometric accuracies ground in the bearing surfaces. Accordingly, before the present invention, the bearing industry called the honing of tapered roller bearing surfaces a geometry destroying process since it was found that the prior art honing machines honed a shallowness in the center of the bearing surfaces, whereby the rollers would tend to skew and the bearings would not carry the loads that they should, and the bearings would not operate with quietness and precision since the rollers moved in a skewed relationship. In order to prevent skewing of the rollers in a tapered roller bearing, the bearing industry grinds the tapered bearing surfaces in a manner to produce a high center thereon, so that the rollers contact the center first, and as the bearing surfaces wear, the contact is spread completely across the bearing surfaces to provide true straightness on the races and also to provide an optimum rolling condition. Heretofore, attempts at honing the high centered or crowned surface on such bearing races have met with failure since the prior art honing machines tended to hone longer in the center of the bearing surface than they did at each end of the bearing surface, and a low center or shallowness resulted with a destruction of the geometry that was built into the bearing surface by the previous grinding operation. In view of the foregoing, it is an important object of the present invention to provide a honing machine which overcomes the aforementioned disadvantages of the prior art honing machines which disadvantages have been encountered by the tapered roller bearing industry in previous attempts to hone the bearing surfaces of the raceways in tapered roller bearings.

The honing machine of the present invention is adapted to hone the bearing surface of the cup or cone of a tapered roller bearing at high production rates, and with great accuracy in roundness, straightness and concentricity. The honing machine is constructed and arranged so that it may be quickly and easily changed over from a cone surface honing operation to a cup surface honing operation, or to a straight surface honing operation, in a minimum of time and with a minimum expense. The workpieces may be loaded and unloaded manually, or automatically with load and unload chutes. Cone workpieces are located at a driving spindle in a centerless relationship by a tool slide which is provided with an arbor carrying carbide shoes for guiding action on the inner diameter of the cone workpieces. Bearing cup workpieces are guided by carbide shoes referenced on the outer diameter of the cup. Fluid is forced between the guiding shoes and the workpiece reference surface so that the workpiece rotates on a fluid film. Each workpiece is located against a magnetic chuck on the driving spindle, and while the chuck rotates the workpiece an abrading member fed by fluid pressure is reciprocated across the bearing surface under a cam controlled stroking mechanism, so as to remove stock efficiently and generate accurate geometric form and develop the desired surface finish characteristics. When the honing cycle terminates the tool slide retracts and the workpiece is automatically unloaded. The honing machine of the present invention is adapted to generate crown conditions on the bearing surfaces of tapered cups and cones from a straight condition to any required crown condition. The honing machine of the present invention improves surface lay pattern, roundness and concentricity of a tapered bearing race to the reference surface, and generates accurate surface finishes parallel to the track and across the track.

It is another object of the present invention to provide a honing machine which is capable of honing tapered bearing surfaces under conditions of controlled abrading member length of stroke, and controlled combinations of abrading member motions, speeds and pressures to keep the abrading member, as a stone, self-dressing and removing stock efficiently and generating accurate geometric form with the desired surface finish and lay pattern characteristics.

It is a further object of the present invention to provide a honing machine which incorporates long abrading member life, whereby machine downtime is reduced and production increased.

It is still another object of the present invention to provide a honing machine comprising, means for rotating a workpiece having an annular surface, means for locating the workpiece on said means for rotating the workpiece in a centerless relationship, means for forcing fluid between the locating means and the workpiece so that the workpiece rotates on a fluid film, a tool holder assembly carrying an abrading member adjacent the workpiece for honing engagement of the abrading member with the annular surface for honing said surface, and, means attached to said tool holder assembly for reciprocating the tool holder assembly to reciprocate the abrading member a controlled length of stroke over said annular surface and under controlled speed variations during each stroke.

It is still a further object of this invention to provide a honing machine comprising, means for rotating a workpiece having an annular surface including an electromagnetic means for maintaining the workpiece in axial position during rotation thereof; and, means for locating the workpiece on the means for rotating the workpiece including a guide means engageable with a surface opposed to the annular surface for maintaining the workpiece in a centerless relationship and in radial position during rotation of the workpiece and a honing operation on said annular surface.

It is still another object of the present invention to provide a novel and improved honing machine which is provided with a cam means for controlling the speed of movement of a honing tool during a honing operation, and which is further provided with a stroke length control means comprising a pair of parallel bars actuated by said cam means.

It is a further object of this invention to provide a honing machine comprising: rotatable means maintaining a workpiece having an annular surface in axial position during rotation of the workpiece; means for rotating said workpiece axial position maintaining means; means for locating the workpiece on said axial position maintaining means for rotating the workpiece; a tool feed fluid cylinder carrying an abrading member adjacent the workpiece for honing engagement of the abrading member with the workpiece annular surface for honing said surface; a tool engagement fluid cylinder carrying said tool feed fluid cylinder for moving said tool feed fluid cylinder toward and away from the workpiece annular surface; a compound slide assembly including a vertically movable slide and a horizontally movable slide; a housing on said horizontally movable slide; a reciprocating shaft carried on said housing and having said tool engagement fluid cylinder mounted on one end thereof; means connected to the other end of said reciprocating shaft for controlling the length of stroke of the abrading member; means connected to the length of stroke controlling means for controlling the speed and direction of movement of said abrading member; and, power means for operating said means for controlling the speed and direction of movement of said abrading member.

Other features and advantages of this invention will be apparent from the following detailed description, appended claims, and the accompanying drawings.

In the drawings:

FIG. 7 is a fragmentary, elevational view of the structure illustrated in FIG. 6, with parts added, taken along the line 7—7 thereof, and looking in the direction of the arrows;

FIG. 8 is a fragmentary top plan view of the structure illustrated in FIG. 7, showing parts thereof in section as taken along the line 8—8 of FIG. 7, and looking in the direction of the arrows;

FIG. 9 is an enlarged, elevational section view of the workpiece loading and unloading means illustrated in FIG. 3, taken along the line 9—9 thereof, and looking in the direction of the arrows;

Figure 16:
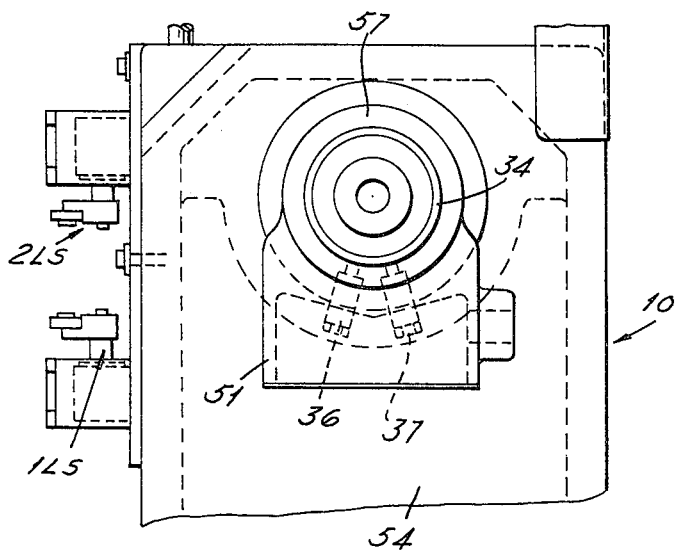
FIG. 16 is a fragmentary, elevational view of the structure illustrated in FIG. 6, with parts removed, taken along the line 16—16 thereof, and looking in the direction of the arrows.
Figure 22:
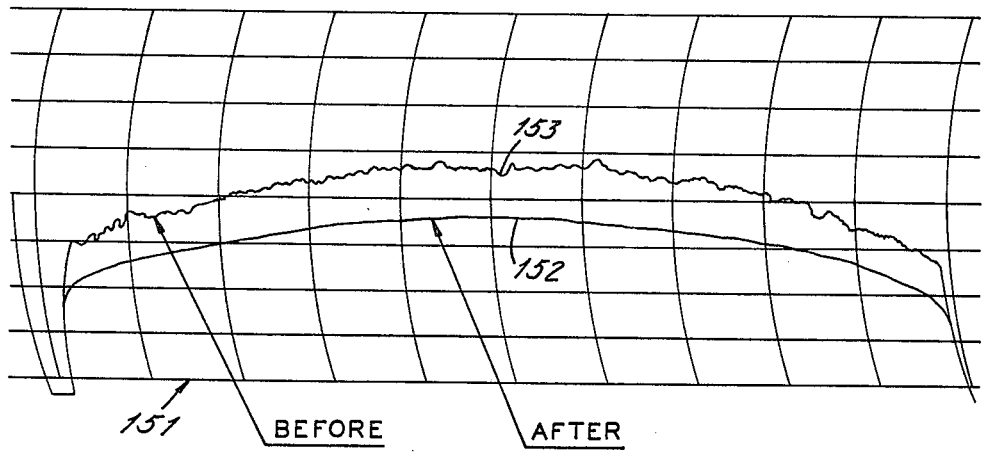
Figure 17:
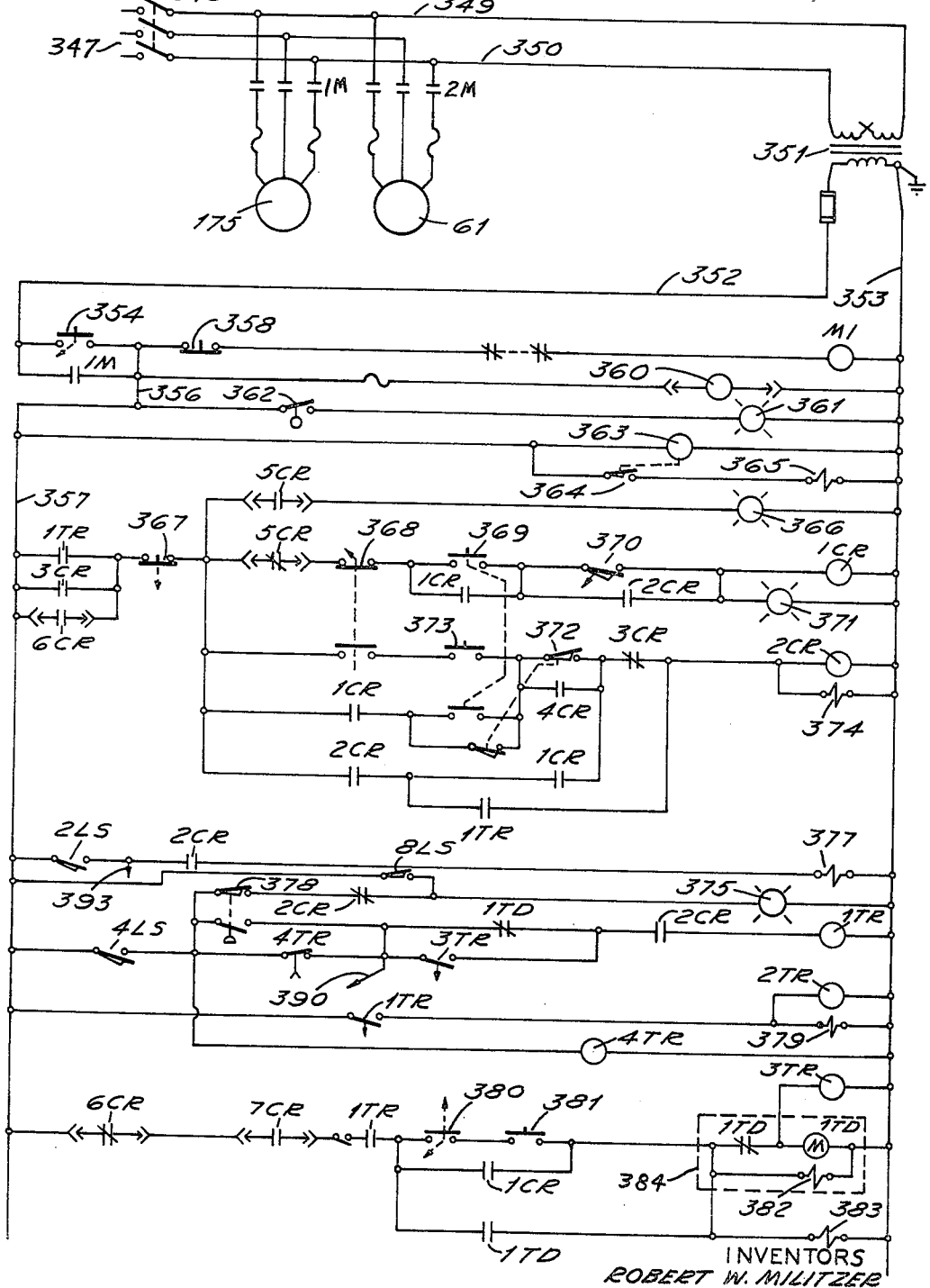
FIG. 17 is the first part of an electrical diagram for illustrating an electrical circuit for controlling the operation of the honing machine illustrated in FIGS. 1 through 16.

FIG. 17-A is an electrical diagram illustrating the second part of the electrical circuit of FIG. 17 for controlling the operation of the honing machine illustrated in FIGS. 1–16;

FIG. 18 is a pneumatic diagram of an illustrative pneumatic operating circuit used with the honing machine illustrated in FIGS. 1–16;

FIG. 19 is an elevational section view of an illustrative tapered roller bearing having a cone raceway and a cup raceway of the type which may be honed with the honing machine illustrated in FIGS. 1–16;

FIG. 20 illustrates two polar geometry charts illustrating roundness of the bearing surface on a tapered bearing cone raceway before and after said raceway has been honed by the honing machine as illustrated in FIGS. 1–16;

FIG. 21 comprises a pair of polar geometry charts showing the concentricity and waviness factors in a tapered bearing cone raceway before and after it has been honed by the honing machine illustrated in FIGS. 1–16;

FIG. 22 is a profile chart showing the crown or contour of the surface of a tapered bearing cone raceway before and after honing by the honing machine illustrated in FIGS. 1–16;

FIG. 23 is a fragmentary, schematic section view of a tooling set-up for honing the cup raceway of a tapered roller bearing; and, FIG. 24 is an elevational view of the structure illustrated in FIG. 23, taken along the line 24—24 thereof, and looking in the direction of the arrows.

GENERAL DESCRIPTION

Figure 1:
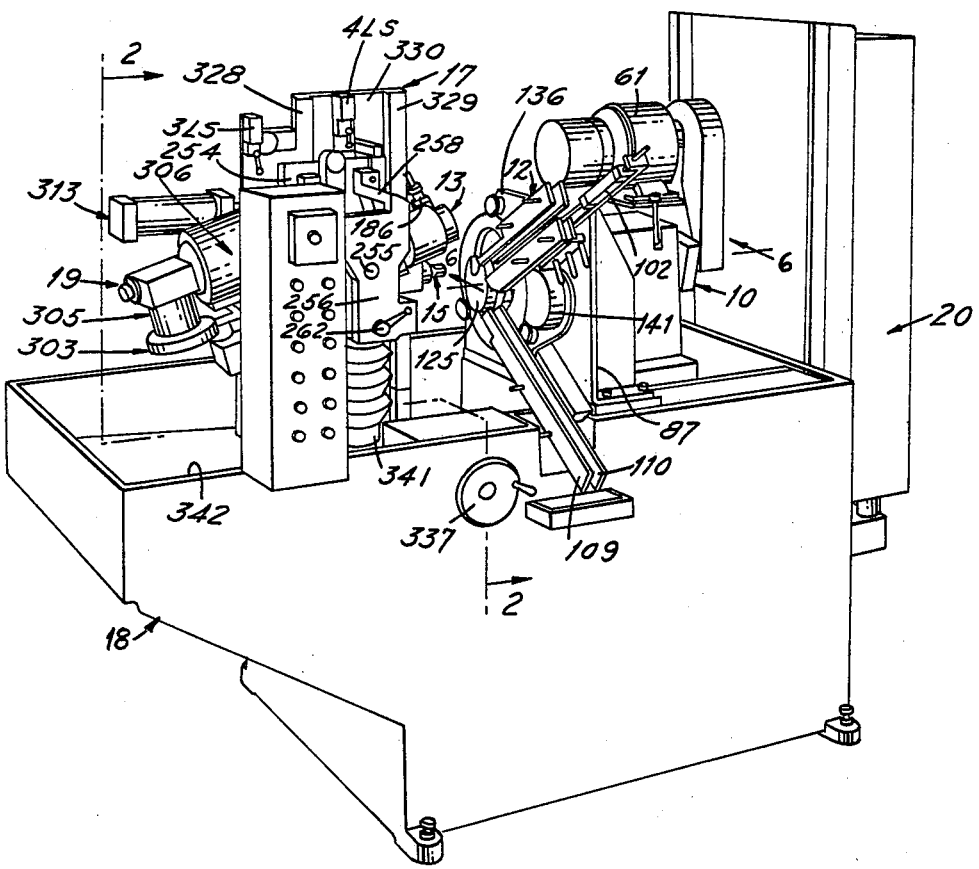
FIG. 1 is a perspective view of a honing machine made in accordance with the principles of the present invention.
Figure 3:
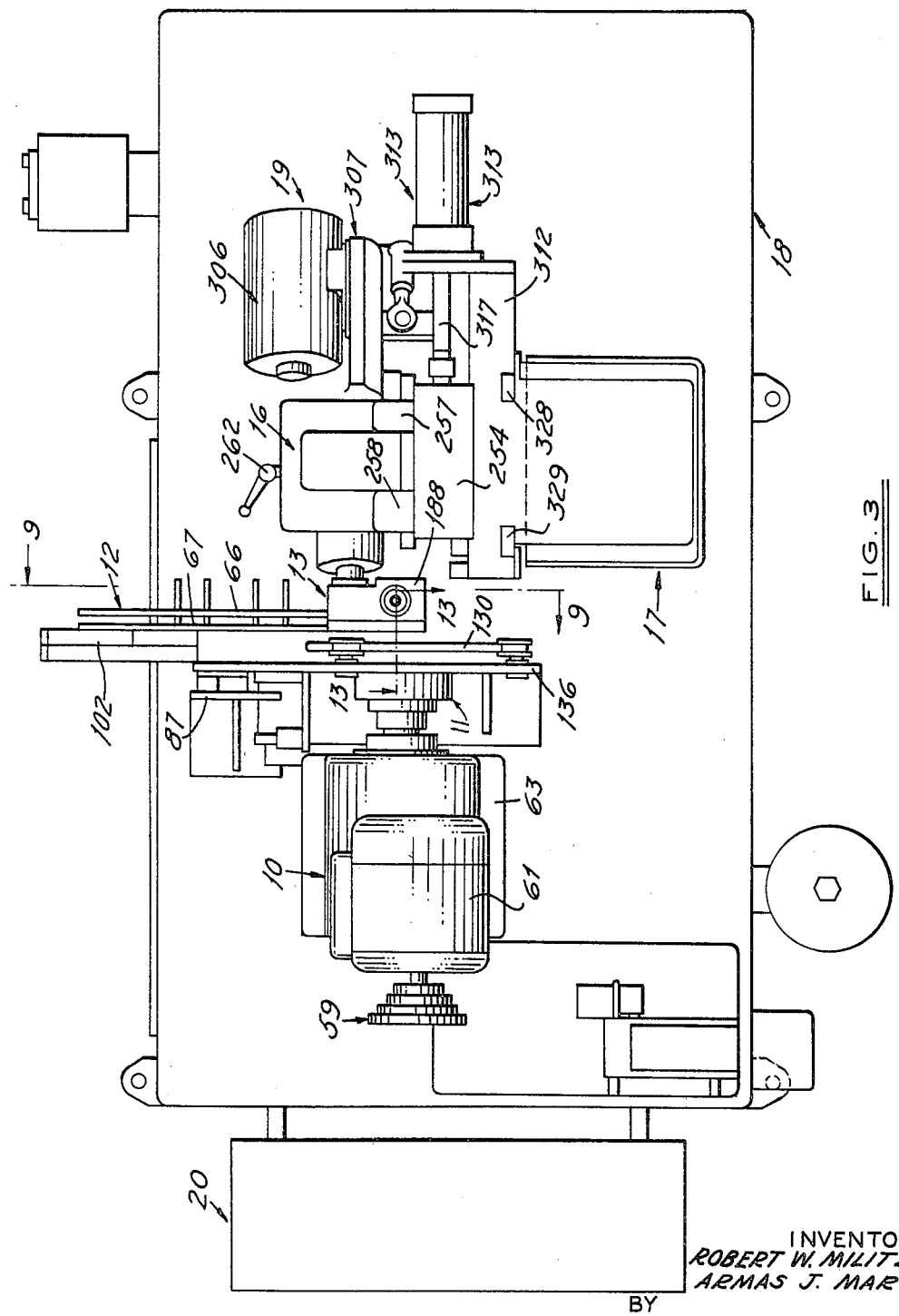
FIG. 3 is a top plan view of the honing machine illustrated in FIG. 1.

Referring now to the drawings, and in particular to FIGS. 3, the honing machine of the present invention comprises generally a means for rotating a workpiece having a tapered annular surface including a splindle assembly generally indicated by the numeral 10 and an electromagnetic chuck generally indicated by the numeral 11. As shown in FIG. 1, the honing machine of the present invention further includes a means for locating a workpiece on the workpiece rotating means, and the locating means comprises the automatic workpiece load and unload means generally indicated by the numeral 12 and the locating arbor generally indicated by the numeral 15. The locating arbor 15 is adapted to guide a workpiece, as generally indicated by the numeral 14 in FIG. 13, during a honing operation by an abrading member, such as an abrasive stone or stick, carried by a tool holder assembly generally indicated by the numeral 13. The honing machine further includes means for reciprocating the tool holder assembly 13 so as to reciprocate the abrading member through a controlled length of stroke over the tapered annular surface on a workpiece and under controlled speed variations during each stroke. The means for reciprocating the tool holder assembly includes the compound slide assembly generally indicated by the numeral 16 in FIG. 3 and a reciprocating drive assembly generally indicated by the numeral 19. The compound slide assembly 16 operatively carries the reciprocating drive assembly 19. The compound slide assembly 16 is operatively mounted on the column 17 which is supported on a suitable base or housing 18. In FIG. 3, the numeral 20 generally indicates a housing for the electrical control apparatus for the machine. The aforedescribed general structure of the honing machine of the present invention is desicribed in detail hereinafter, and the advantages provided by this machine and the problems solved will be readily observed from the following detailed description of the structure and operation of the machine.

WORKPIECE ROTATING MEANS

Figure 6:
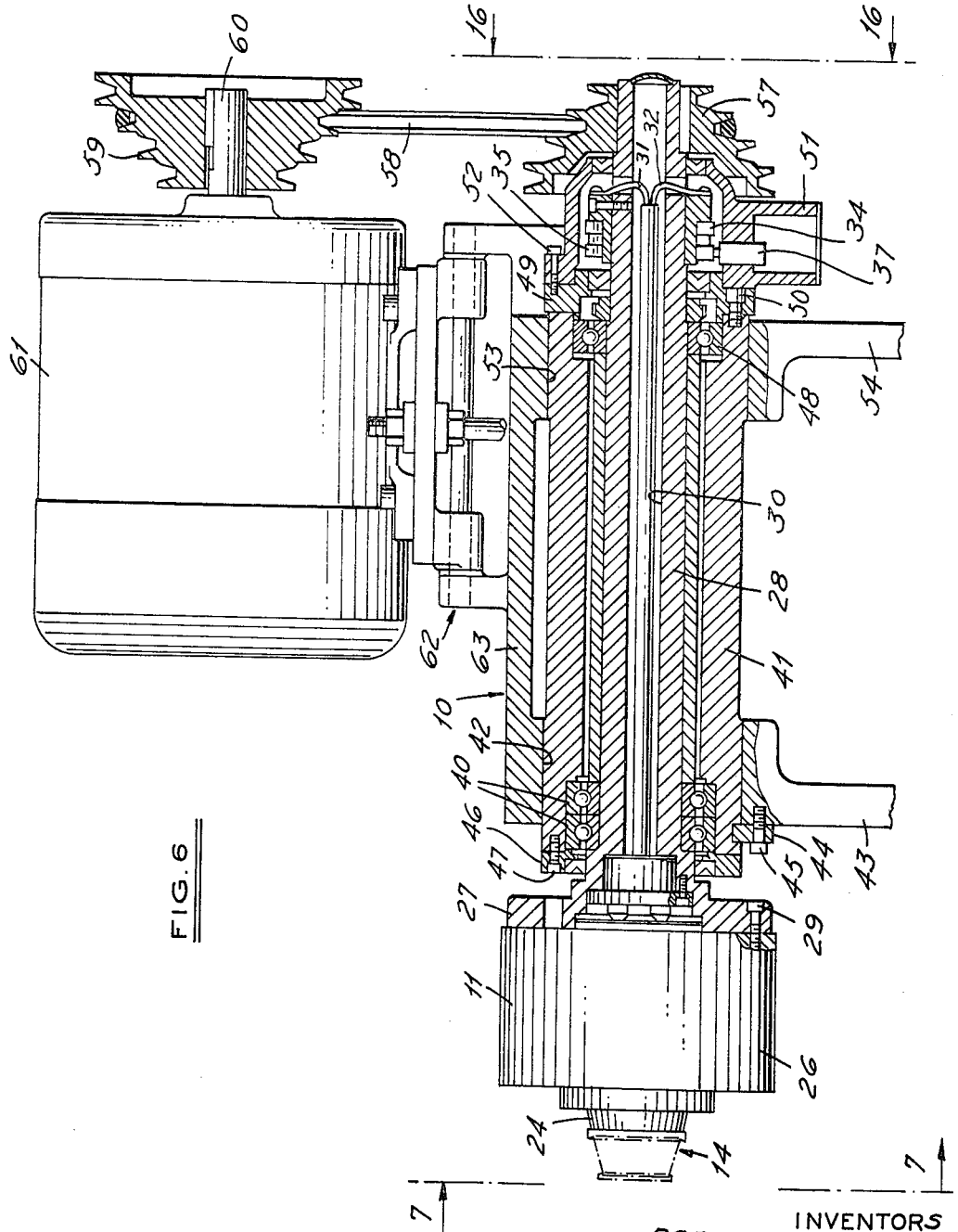
FIG. 6 is a fragmentary, enlarged, elevational section view, with parts removed, of the structure illustrated in FIG. 1, taken along the line 6—6 thereof, and looking in the direction of the arrows.
Figure 13:
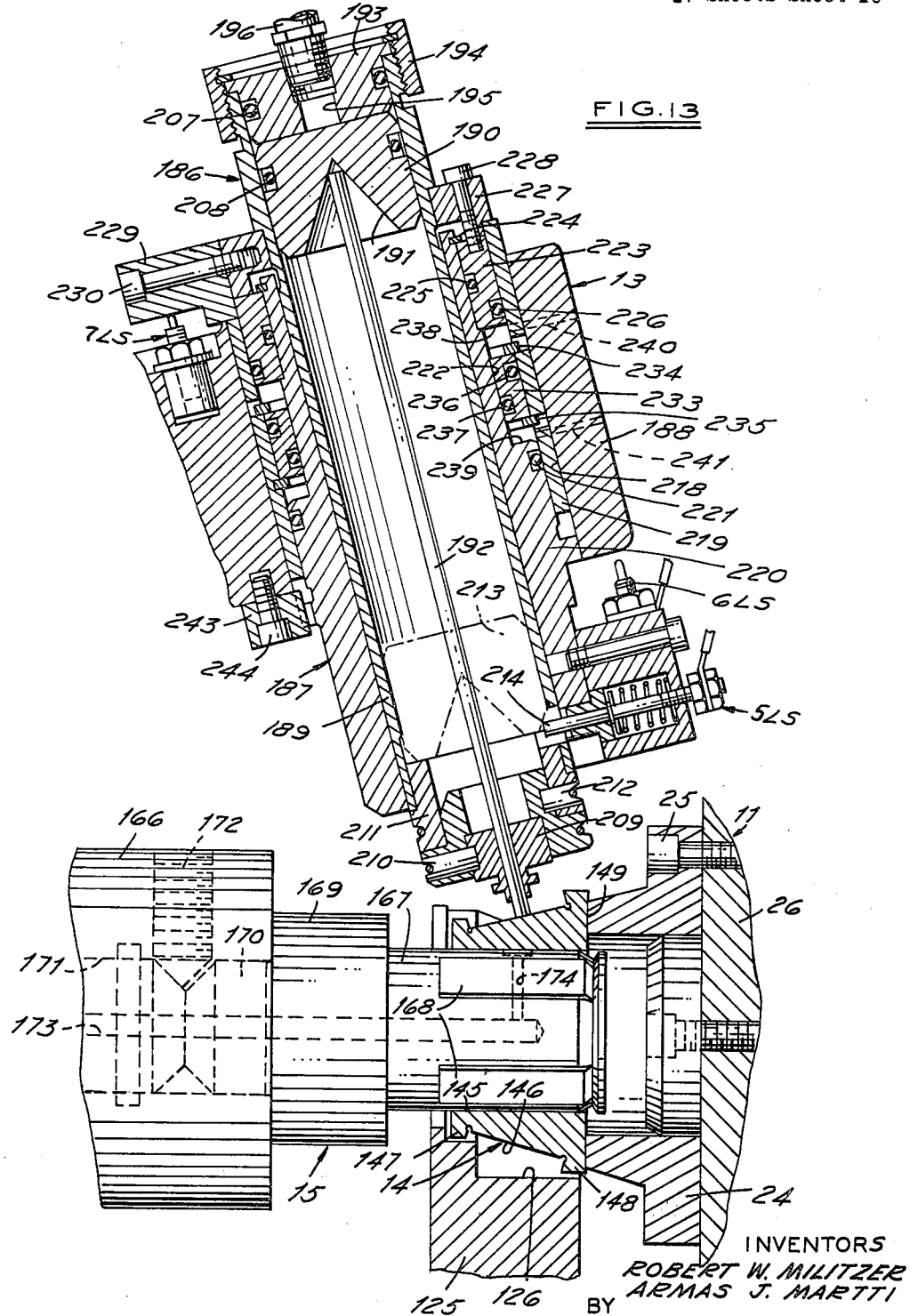
FIG. 13 is a fragmentary, enlarged, elevational section view of the tool holder assembly illustrated in FIG. 3, taken along the line 13—13 thereof, and looking in the direction of the arrows.

The means for rotating a workpiece having a tapered annular surface includes the electromagnetic chuck 11 which is shown in FIG. 6 as including a chuck drive plate 24 adapted to seat against one end surface of the workpiece 14 for driving engagement therewith. It will be understood that any suitable electromagnetic chuck may be employed for rotating the workpiece 14. As shown in FIG. 13, the chuck drive plate 24 is secured to the front end of the chuck body 26 by any suitable means, as by the screws 25. As shown in FIG. 6, the chuck 11 is secured to the spindle nose flange 27 of a hollow spindle 28 by any suitable means, as by the screws 29. The spindle 28 is provided with an axial bore 30 which extends therethrough and through which is mounted the lead wires 31 and 32 for the electromagnetic chuck 11. As shown in the circuit diagram of FIG. 17a, the lead wires 31 and 32 are operatively connected to the chuck coil 33. As shown in FIG. 6, the lead wires 31 and 32 are connected to a suitable source of power by means of the commutator rings 34 and 35 respectively. The commutator ring 34 is in sliding operative engagement with a brush 36 as shown in FIG. 16. As shown in FIG. 6, the commutator ring 35 is in sliding operative engagement with a brush 37.

As shown in FIG. 6 the spindle 28 is rotatably mounted at the front end thereof by the double row of ball bearings 40 which are operatively mounted in the front end of the spindle sleeve 41. The spindle sleeve 41 is operatively mounted at the front end thereof in the bore 42 formed through the housing front wall 43 of the spindle housing which is mounted on the base 18. The spindle sleeve 41 is maintained in axial position by the key 44 which engages a slot in the front end of the sleeve 41 and which is secured to the housing wall 43 by the screw 45. The bearings 40 are retained in position by any suitable means, as by the end cover 46 which is secured to the front end of the spindle sleeve 41 by the screws 47.

The rear end of the spindle 28 is rotatably mounted in the bearing 48 which is seated in a suitable recess in the rear end of the spindle sleeve 41. The bearing 48 is retained in place by the end cover 49 which is secured to the rear end of the spindle sleeve 41 by screws 50. The commutators 34 and 35 are enclosed by a commutator housing 51 which is secured to the end cover 49 by the screws 52. The rear end of the spindle sleeve 41 is mounted in the bore 53 formed through the housing rear wall 54.

As shown in FIG. 6, a four-groove pulley 57 is mounted on the rear end of the spindle 28, and it is driven by the V-belt 58 which is driven by the four-groove pulley 59. The pulleys 57 and 59 provide a plurality of speed changes. The pulley 59 is fixed on the output shaft 60 of a suitable electric drive motor 61. The motor 61 may be of any suitable type. As, for example, a suitable motor is a one horsepower, 1800 r.p.m. motor. The electric drive motor 61 is supported by a suitable motor support means, generally indicated by the numeral 62, on the housing top wall 63.

WORKPIECE LOCATING MEANS

Figure 12:
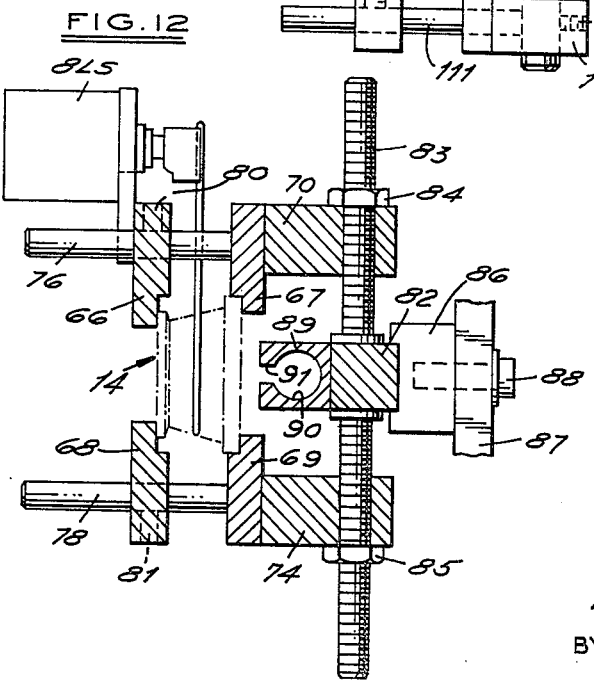
FIG. 12 is a fragmentary, enlarged, elevational section view of the structure illustrated in FIG. 9, taken along the line 12—12 thereof, and looking in the direction of the arrows.

FIG. 9 illustrates a load chute for automatically loading the workpieces 14. As shown in FIG. 12, the load chute includes an upper pair of spaced apart guide rails 66 and 67, and a downwardly spaced apart lower pair of guide rails 68 and 69. As shown in FIG. 9, the inner, upper guide rail 67 is secured by the guide bars 76 and 77 to a longitudinally extended guide rail support block 70. As shown in FIG. 9, the guide rail support block 70 is slidably mounted on a spaced apart pair of guide bars 71 and 72. The inner, lower guide rail 69 is similarly secured by a pair of guide bars 78 and 79 to a rail support block 74. The outer, upper guide rail 66 is secured to the guide bars 76 and 77 in an adjusted position spaced from the guide rail 67 the screws 80. As shown in FIG. 12, the outer, lower guide rail 68 is similarly secured to the guide bars 78 and 79 by screws 81. As shown in FIG. 12, the last described two pairs of guide rails are laterally spaced apart so that the workpiece 14 is adapted to be rollably mounted therebetween. The inner faces of the guide rails 66, 67, 68 and 69 are provided with recesses, shown in FIG. 12, for reception of the workpieces 14.

As shown in FIG. 12, the support blocks 70 and 74 are threadably mounted on the elongated threaded shaft 83 which is provided with left and right hand threads on the upper and lower ends thereof, whereby when shaft 83 is rotated, the blocks 70 and 74 will be either moved apart or moved together, as desired. The shaft 83 is journalled at a central position on the elongated cylinder support block 82. A pair of lock nuts 84 and 85 are employed for locking the blocks 70 and 74 in an adjusted position. It will be seen that the upper guide rails 66 and 67 may thus be adjusted relative to the lower pair of guide rails 68 and 69 for the reception of various sizes of workpieces.

As shown in FIG. 12, the cylinder support block 82 is secured to a mounting block 86 which is attached to the vertical column or plate 87 by screws 88. The guide bars 71 and 72 are also caried by the support block 82.

As shown in FIGS. 9 and 12, the support block 82 has fixed on the outer face thereof an elongated slide bushing 89 which is provided with an axial bore 90 that is open at the front side thereof by the slot 91.

Figure 10:
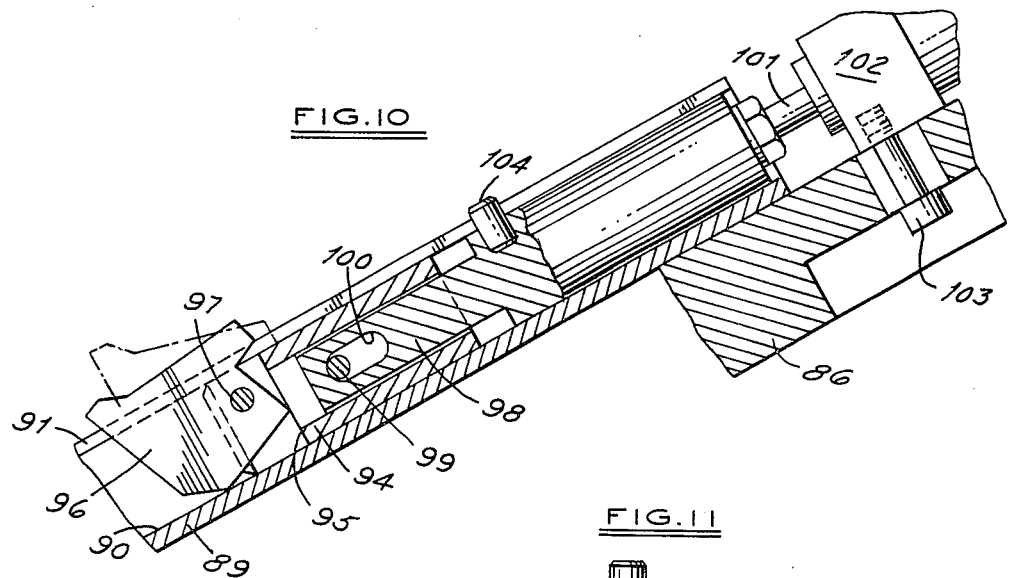
FIG. 10 is a fragmentary, enlarged, elevational section view of the structure illustrated in FIG. 9, taken along the line 10—10 thereof, and looking in the direction of the arrows.

As shown in FIG. 10, the load chute is provided with a power means for actuating the workpieces 14 down toward the chuck 11. The workpiece actuating means includes a slide dog 94 which is slidable in the bore 90 in the slide bushing 89. A vertical slot 95 is provided in the front end of the dog 94, and pivotally mounted in this slot is a feed finger 96. The finger 96 is pivotally mounted on the pivot pin 97 which is mounted in the front end of the dog 94. The dog 94 is provided with an axial bore therethrough in which is slidably mounted an actuator dog 98. A transverse limiting pin 99 is mounted in the dog 94 and extends through an elongated slot 100 formed through the front end of the actuator dog 98. The rear end of the dog 98 is enlarged and is connected to the cylinder rod 101 of a suitable fluid cylinder 102, as for example, an air cylinder. The cylinder 102 is adjustably secured by the screw 103 to the mounting block 86. A guide pin 104 is mounted in the dog 98 and slides in the slide bushing slot 91 to prevent rotation of the dogs 94 and 98. As shown in FIG. 18, the cylinder 102 is connected by the air lines 92 and 93 to a suitable source of air under pressure, as explained more fully hereinafter. As shown in FIG. 9, the air cylinder 102 may be adjusted relative to the block 86 by an adjusting screw 105 which is attached to the rear end of the cylinder 102 and which is threadably mounted through the plate 106 carried on the rear end of the block 86.

As shown in FIG. 18, air under pressure is supplied to the load chute cylinder 102 through the air supply lines 92 and 93. The supply line 92 is connected through the four-way, solenoid operated valve 150 to supply line 199 which is connected to a suitable source of air under pressure by the lubricator 200, the flow control valve 201, the filter 202, and the shut-off valve 203. The supply line 93 is also connected to the supply line 199 by a lubricator and the flow control valve 107. As viewed in FIG. 10, when the cylinder 102 is energized to move the cylinder rod 101 to the left, the dog 98 moves to the left until the pin 99 engages the rear end of the slot 100 at which time the finger 96 is pivoted clockwise to the dotted line position. The finger 96 and slide dog 94 are then moved together to actuate a workpiece 14 down the load chute. This action is reversed when the cylinder 102 is reversely energized.

As shown in FIG. 9, the load chute is disposed at an angle of approximately 30° above the horizontal so that the workpieces 14 may roll down the chute by gravity and be assisted, if need be, by the actuating cylinder 102. An unload chute is also shown in FIG. 9 as being disposed at an angle of approximately 30° below the horizontal to permit workpieces 14 to be discharged by gravity into a receptacle or into a work transfer means for conveying the workpieces to another machine for a succeeding operation.

Figure 11:
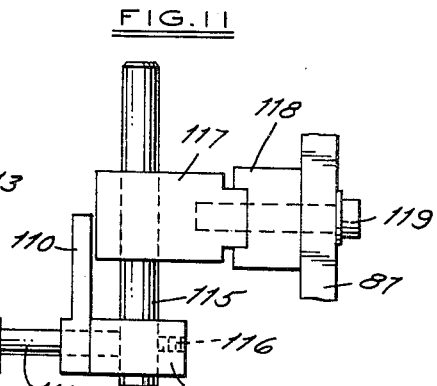
FIG. 11 is a fragmentary, enlarged, elevational view of the structure illustrated in FIG. 9, taken along the line 11—11 thereof, and looking in the direction of the arrows.

As best seen in FIG. 11, the unload chute includes a pair of laterally spaced apart guide rails 109 and 110 which are carried on a pair of spaced apart guide bars 111. The inner ends of the guide bars 111 are fixed to the rail support block 112. The outer guide rail 109 is secured to the guide bars 111 by screws 113. The rail support block 112 is secured to the lower ends of a pair of guide bars 114 and 115 (FIG. 9) by screws 116 (FIG. 11). A chute support block 117 is secured to the guide bars 114 and 115. The block 117 is also secured to the mounting block 118 and to the vertical plate 87 by screws 119.

As shown in FIG. 9, the workpieces 14 are moved from the load chute into the working position and then to the unload chute by an oscillating dial loader 125 which is provided with a U-shaped pocket or slot 126 in which is seated a workpiece 14. When the dial loader 125 turns clockwise to discharge a workpiece 14 into the unload chute, the key 122 functions to engage the workpiece 14 in the dial loader 125 and break it lose so that it will roll by gravity from the pocket 126, and into the unload chute. The key 122 is secured in a slot 124 by the screw 123. The slot 124 is formed in the inner face of the unload chute inner guide rail 110. FIG. 1 illustrates the relative positions of the load chute, the dial loader 125 and the unload chute.

As shown in FIG. 7, the dial loader 125 is mounted on the plate 128 by means of the screws 127. The plate 128 is mounted on the circular plate 130 by the screws 129. The plate 130 is provided with an opening 131 which exposes the chuck 11 to the rear side of the circular dial loader 125. The circular plate 130 is rotatably mounted on a plurality of guide rollers 132, 133 and 134. As best seen in FIG. 8, the guide roller 133 is rotatably mounted in a bushing 135 that is secured in a bore in the vertical support plate 136. The support plate 136 is mounted on the base 18. The other guide rollers 132 and 134 are similarly mounted. It will be seen that the workpiece carrier means or dial loader 125 is interchangeable so that different size bearings may be honed.

As best seen in FIG. 8, a ring gear 137 is mounted by the bolts 138 to the rear face of the rotatable member or circular plate 130. A drive gear 139 is meshed with the ring gear 137. The drive gear 139 is secured to the output shaft 140 of a suitable rotary fluid actuated cylinder 141. The rotary fluid actuated cylinder 141 is operatively secured to the vertical plate 142 which is mounted on the base 18. As shown in FIG. 18, the rotary fluid actuated cylinder 141 is shown connected to the air supply by the air lines 143 and 144, the valve 150, the air line 199, the lubricator 200, the valve 201, the filter 202, and the valve 203.

It will seem that during an unloading oeration the dial loader 125 is rotated clockwise by the rotary fluid actuated cylinder 141, from a honing position shown in FIG. 7 to an unload position 30° below the horizontal. The dial loader 125 thus rotates 120° from the honing position to the unload position. When the dial loader 125 is rotated counter-clockwise, as viewed in FIG. 7, from the unload position, it passes the load chute and the next workpiece 14 moves into the workseat or slot 126 during such counter-clockwise movement back to the honing position. It will be seen that the plate 130, the dial loader 125 and the cylinder 141 function as a workpiece transfer means.

The workpiece 14 (FIG. 13) shows the cone of a tapered roller bearing that has a bore 145. The workpiece 14 is shown as being provided with a tapered annular bearing surface 146 on the outer periphery thereof. The bearing surface 146 is bounded by the lips 147 and 148. The workpiece 14 is provided with the rear face 149 which is seated against the magnetic chuck drive plate 24.

FIG. 22 illustrates a profilometer chart 151 on which is shown the profile 153 of the crowned surface of a tapered annular bearing surface as 146 before it has been honed by the machine of the present invention. Numeral 152 shows the improvement in surface finish and contour after the bearing surface has been honed. The surface represented by the numeral 152 shows that the geometric form of the crown has not been damaged, yet the surface finish has been improved. The prior art honing machines with which honing of a tapered bearing surface was attempted damaged the crowned shape demonstrated by the numerals 152 and 153. The prior art honing machines honed too much material from the center area of the bearing surface to make the surface shallow and destroyed the desired geometric contour. The honing machine of the present invention can generate crown conditions from straight to .000050″. It can remove from .00001″ to .00005″ of stock on the diameter of a bearing as 14.

FIG. 20 illustrates a pair of polar geometry charts 154 and 156 which show the roundness profiles before and after honing by a machine made in accordance with the present invention. The numeral 155 indicates the roundness profile of the tapered annular bearing surface 146 on a workpiece 14 before honing, and the numeral 157 indicates the roundness profile of the tapered annular bearing surface 146 after honing. It will be seen that the honing process improves not only the roundness, but also the waviness in the bearing surface finish.

FIG. 21 illustrates two polar geometry charts 158 and 161 which illustrate the concentricity between the bore 145 of the workpiece 14 and the annular bearing surface 146. Reference numeral 159 indicates the profile of the bore 145 before honing, and the numeral 162 designates the profile of the bore 145 after honing. Numeral 160 indicates the profile of the bearing surface 146 before honing relative to the bore 145. The numeral 163 indicates the profile of the bearing surface 146 relative to the bore 145 after honing. It will be seen from the charts of FIG. 21 that not only is surface waviness improved, but concentricity between the bore 145 and the bearing surface 146 is also improved when a workpiece is honed with a honing machine made in accordance with the present invention.

As shown in FIG. 13, the arbor 15 is mounted on a shaft 166 which is carried on the compound slide assembly 16. The arbor 15 includes a shaft 167 on which is mounted a plurality of radially spaced-apart carbide shoes 168. In one embodiment, four shoes 168 were employed. It will be understood that the dial loader 125 moves the workpieces 14 into axial relationship with the chuck 11 and that the carbide shoes 168 function to maintain the location of the workpiece 14 in the radial plane while the workpiece is driven magnetically during a honing operation.

It has been found that the guiding of the workpieces 14 by the guide shoes 168 provides a centerless honing operation which improves the concentricity between the workpiece bore 145 and the bearing surface 146, as clearly shown in FIG. 21. It has also been found that the width of the shoes 168 must be wider than the pitch distance from peak to peak of the waves as shown in the profiles indicated by the reference numerals 159 and 162 in FIG. 21. One illustrative example of the width of a shoe 168 is one which is made to a width of 10°.

As shown in FIG. 13, the arbor shaft 167 is provided with a shoulder 169 that abuts against the outer end of the shaft 166. An arbor mounting shaft 170 is connected to the shoulder 169 and is mounted in the bore 171 in the shaft 166. A set screw 172 secures the shaft 170 in place. An axial bore 173 extends through the arbor 15 and communicates with the plurality of transverse bores 174 which extends outward radially to the outer surface of the shaft 167. A suitable fluid is supplied through the bores 173 and 174 to the exterior of the shaft 167 and against the bore 145 of the workpiece 14. Experience has shown that a fluid film is formed between the shoes 168 and the bore 145 to provide optimum centerless honing conditions under substantially nonexistent wear conditions. The bore 173 is connected by a suitable conduit to the fluid pump 175, shown in the electrical diagram of FIG. 17.

FIG. 19 is a cross-sectional view of a typical tapered roller bearing which is generally indicated by the numeral 178. The bearing 178 includes a cone 179 similar to the cone workpiece 14 illustrated in FIG. 13. The numeral 180 indicates the cup portion of the bearing. The numeral 181 illustrates the rollers which are operatively mounted between the cone 179 and the cup 180. The numeral 183 indicates the internal tapered annular bearing surface on the cup 180. The honing machine of the present invention may be employed for honing a surface as 183 on the race of a roller bearing cup.

FIGS. 23 and 24 illustrate a modified tool setup wherein the arbor shaft 167a is semi-circular in shape and is provided with a plurality of carbide shoes 168a for supporting or referencing the cup 180 on the outer diameter thereof while it is rotated by the drive plate 24 of a magnetic chuck 11. The numeral 13 generally indicates the tool holder assembly which may be suitably adjusted to hone the bearing surface 183. The bearing cups 180 may be manually loaded or automatically loaded in the same manner illustrated hereinbefore for the cone workpieces 14.

TOOL HOLDER ASSEMBLY

FIG. 13 illustrates the tool holder assembly 13 as comprising the abrading member or tool feed fluid cylinder 186 which is operatively mounted in a second cylinder 187 that operates as a tool engagement fluid cylinder. The tool engagement cylinder 187 is carried in a tool holder carrier 188. The tool feed cylinder 186 comprises a cylindrical body 189 which is carried in the bore of the cylindrical body 220 of the cylinder 187. An abrading member feed piston 190 is operatively mounted in the body 189, and it is shown in a fully retracted position in FIG. 13. The piston 190 is provided with a cone-shaped recess 191 in the lower end thereof. The recess 191 seats the upper end of the abrading member 192 which is illustrated as an abrasive stone 192.

The upper end of the cylindrical body 189 is enclosed by the end cap or plug 193 which is secured in place by the retainer nut 194. The plug 193 is provided with an inlet port 195 in which is operatively connected a fluid supply line, as the pressurized air supply line 196. As shown in FIG. 18, the air supply line 196 is connected to the source of pressurized air by the valves 197 and 198, the supply line 199, the lubricator 200, the valve 201, the filter 202, and the valve 203. The end plug 193 is provided with a suitable O-ring seal 207. The piston 190 is provided with a suitable O-ring seal 208.

The lower end of the abrasive stone 192 is slidably mounted through an axial hole in the stone adaptor 209. The stone adaptor 209 is attached by the stone adaptor key 210 to a second stone adaptor which is mounted in the outer end of the cylinder end sleeve 211 by the stone adaptor key 212. The numeral 213 indicates the broken line lower end travel position of the stone piston 190 when the stone 192 is worn and ready for replacement. When the piston 190 is in the broken line position 213 it makes contact with the low voltage contact 214 to actuate a stone wear signal 5LS.

The tool engagement cylinder 187 includes a sleeve 219 which is seated in the bore 218 formed in the tool holder carrier 188. The cylinder body 220 is slidably mounted in the sleeve 219 and the body 220 is provided with an O-ring sealing means 221 on the lower end thereof which slidably engages the sleeve 219 for sealing thereagainst. The upper end of the cylinder body 220 is provided with a reduced outer diameter 222 which is spaced from the sleeve 219 for forming a pair of cylinders 238 and 239. A movable upper gland 223 is attached to the cylinder body 220 by the retainer clip ring 224 and the retainer collar 227 and screw 228. The gland 223 is provided with the O-ring seals 225 and 226. The gland 223 encloses the upper end of the cylinder 238. A switch operating block 229 is secured by the screw 230 to the collar 227 for operating the limit switch 7LS when the tool engagement cylinder 187 is in the operative position shown in FIG. 13.

The two cylinders 238 and 239 are formed by the stationary lower gland 233 which is attached to the sleeve 219 by the retainer clip rings 234 and 235. The lower gland 233 is provided with the O-ring seals 236 and 237. The cylinders 238 and 239 are connected to the source of pressurized air by the inlet passages 240 and 241, respectively. As shown in FIG. 18, the inlet passages 240 and 241 are connected to the pressurized air source by the valve 242, the air line 199, the lubricator 200, the valve 201, the filter 202, and the valve 203. As shown in FIG. 13, the cylinder body 220 is guided in the carrier 188 by the key 243 and the screw 244.

The last described tool assembly comprises means for pneumatically actuating the abrasive stone 192 against the bearing surface 146 on the workpiece 14 while the stone is being reciprocated on a path parallel to the surface of the bearing at a high reciprocating speed. The bearing 14 is also rotated by the chuck 11 to generate the contour of the surface 146 and remove stock through constant fluid pressurization transmitted by the piston 190 to the abrasive stick 192. The illustrated tool structure permits the use of a long stick 192, whereby long tool life is provided, and the machine can run for several thousand cycles before the stick 192 must be replaced. The tool engagement cylinder 187 permits the tool cylinder 186 to be raised up in order to get workpieces with lips as 147 and 148 on and off the workpiece locating structure. A one-quarter of an inch stroke of the cylinder 187 is sufficient to insure getting over the maximum lip of most all tapered bearing parts. When the cylinder 187 is moved upwardly, as viewed in FIG. 13, the limit switch 6LS engages the carrier 188 and is operated thereby. It will be seen that the tool holder structure just described can be changed easily to provide different sizes of abrasive stick 192.

TOOL HOLDER RECIPROCATION MEANS

The tool holder reciprocation means is constructed and arranged to provide angular adjustment of the tool holder assembly 13 so that the machine may hone all of the various types of tapered bearings presently manufactured. The tool holder reciprocation means is angularly adjustable about a horizontal axis so that bearings without taper may be honed and bearings having tapers as high as 30° may be honed.

Figure 15:
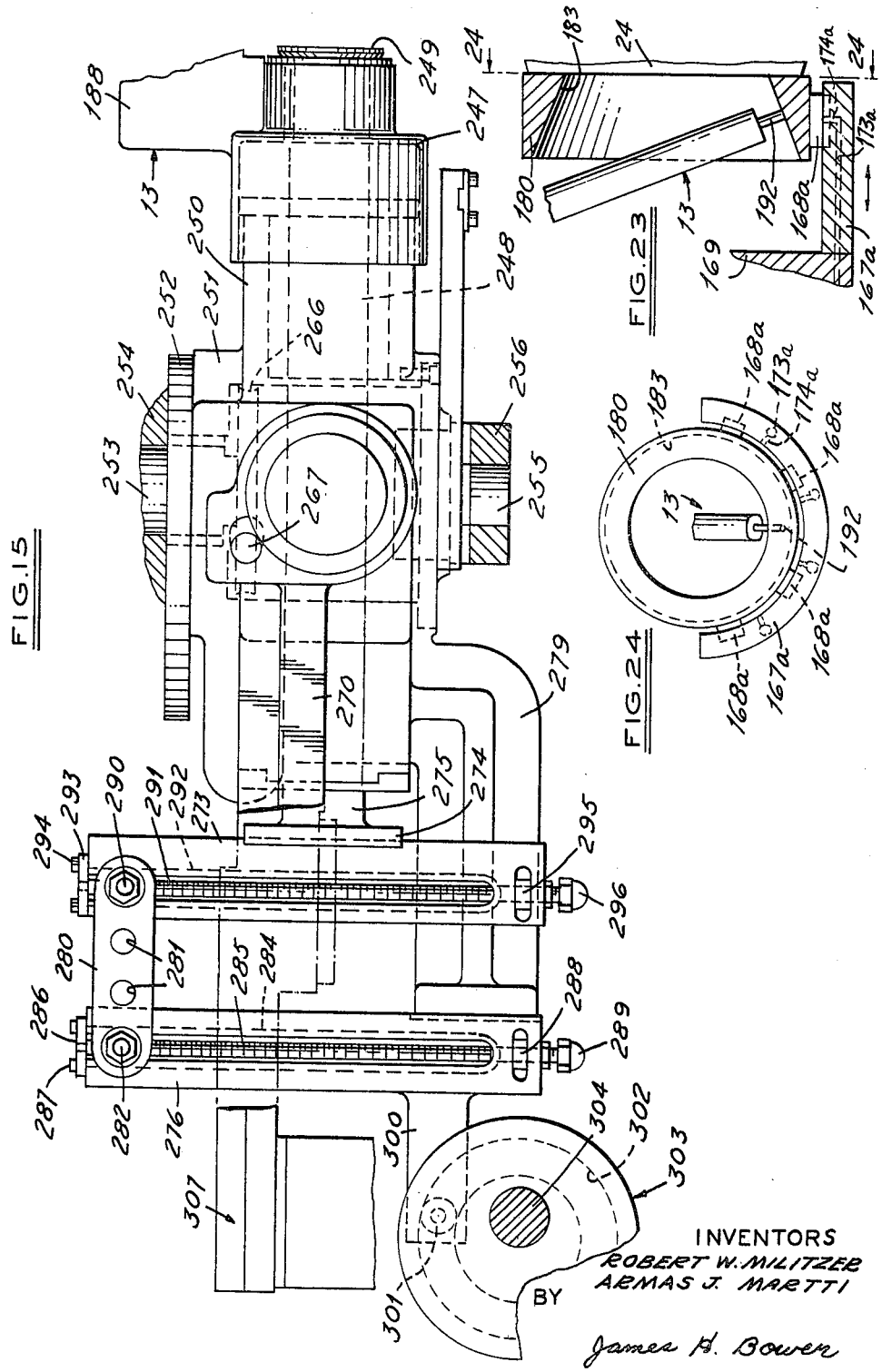
FIG. 15 is a fragmentary, horizontal section view of the structure illustrated in FIG. 14, taken along the line 15—15 thereof, and looking in the direction of the arrows.

As shown in FIG. 15, the tool holder assembly 13 includes a cylindrical, combination dirt covering and housing 247 which is adapted to be mounted on the front end of a spindle or shaft 248 and to be secured thereto by the lock nut means 249. The spindle 248 is slidably mounted for endwise movement in a casting or housing 250 which is pivotally mounted on the horizontal slide 254 to provide the aforementioned angular adjustment for the tool holder assembly 13.

Figure 2:
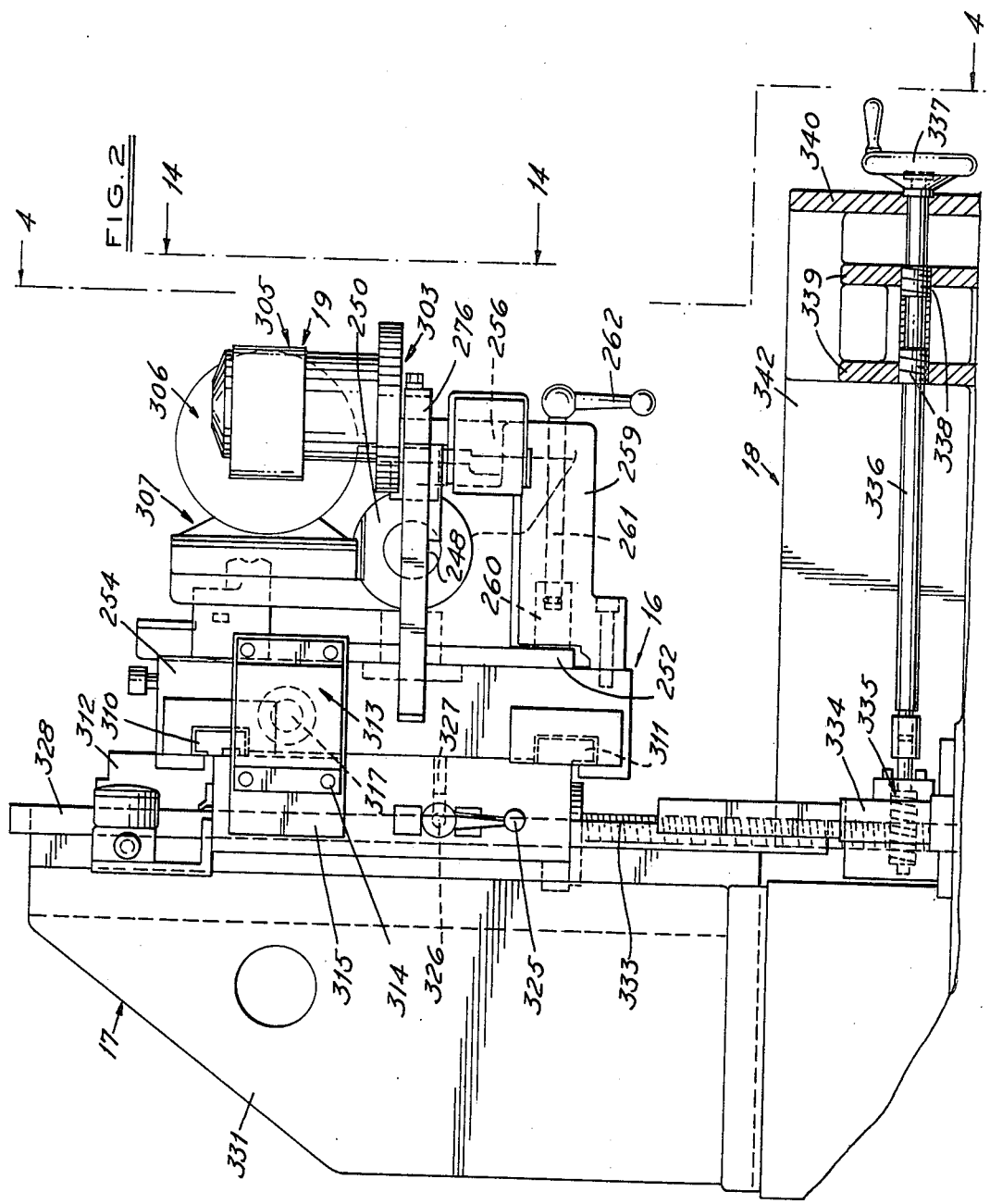
FIG. 2 is a slightly enlarged, elevational view, partly in section, of the honing machine illustrated in FIG. 1, taken substantially along the line 2—2 thereof, and looking in the direction of the arrows.
Figure 4:
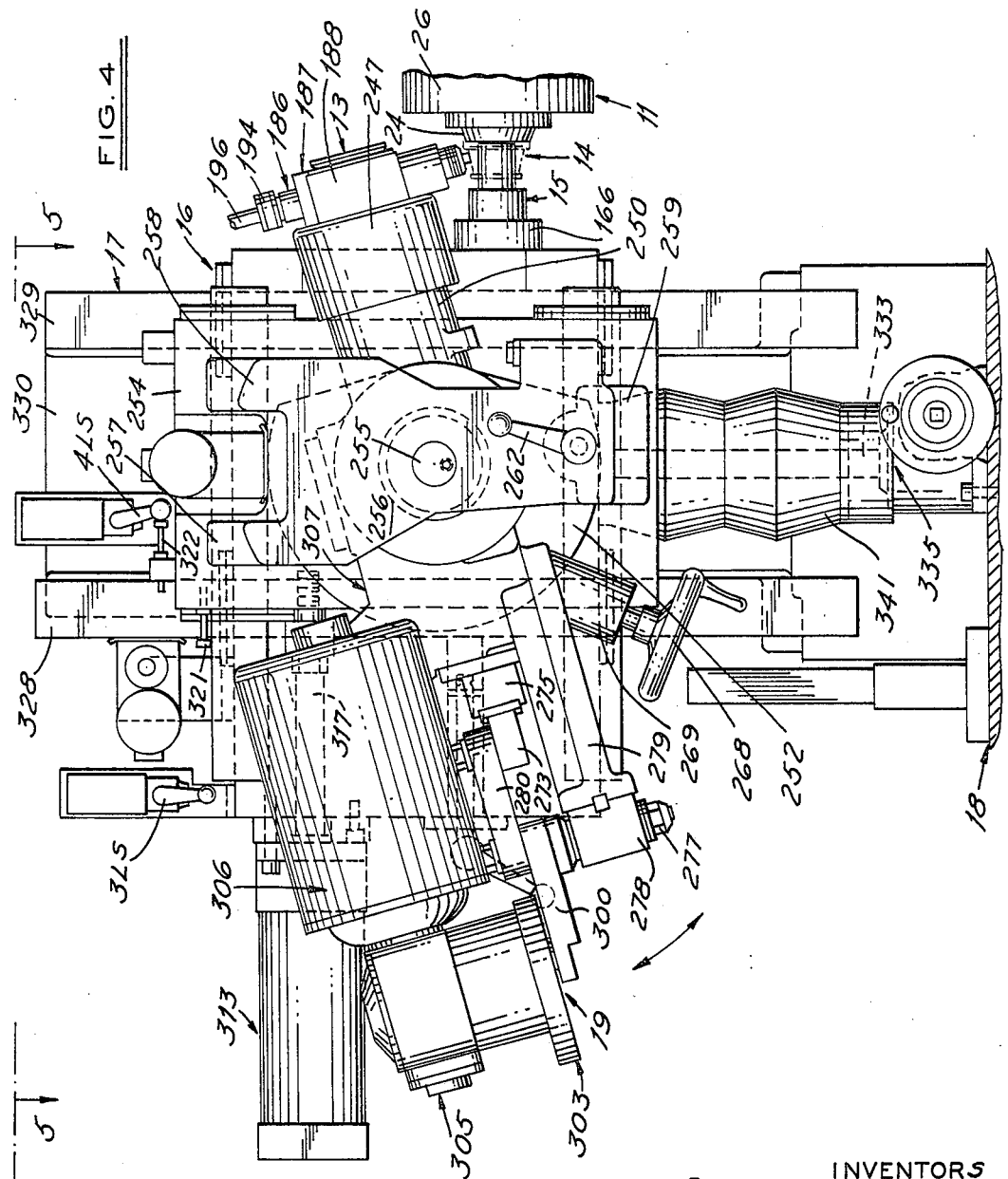
FIG. 4 is a fragmentary, elevational view, partly in section, of the structure illustrated in FIG. 2, taken along the line 4—4 thereof, and looking in the direction of the arrows.

As shown in FIG. 15, the housing 250 is provided with a projection 251 on the inner side thereof to which is attached a partial, circular clamp flange or plate 252. The plate 252 carries a journal or shaft 253 which is pivotally mounted in a suitable bore in the horizontal slide 254. The housing 250 is also provided on the outer side thereof with a journal or shaft 255 which is pivotally mounted in the trunnion vertical wall 256. As best seen in FIG. 4, the trunnion wall 256 is integral with a pair of mounting arms 257 and 258 on the upper end thereof which are secured by any suitable means to the horizontal slide 254. As best seen in FIG. 2, the trunnion includes a bottom arm 259 which is secured to the horizontal slide 254.

As shown in FIG. 2, the clamp plate 252 is adapted to be clamped to the horizontal slide 254 by the clamp block 260. The clamp block 260 is forced inwardly against the plate 252 by the threaded shaft 261 and the manually operated clamp crank 263. The shaft 261 is threadably mounted in the trunnion so that when it is turned the clamp block 260 actuated inwardly or outwardly, as desired.

Figure 14:
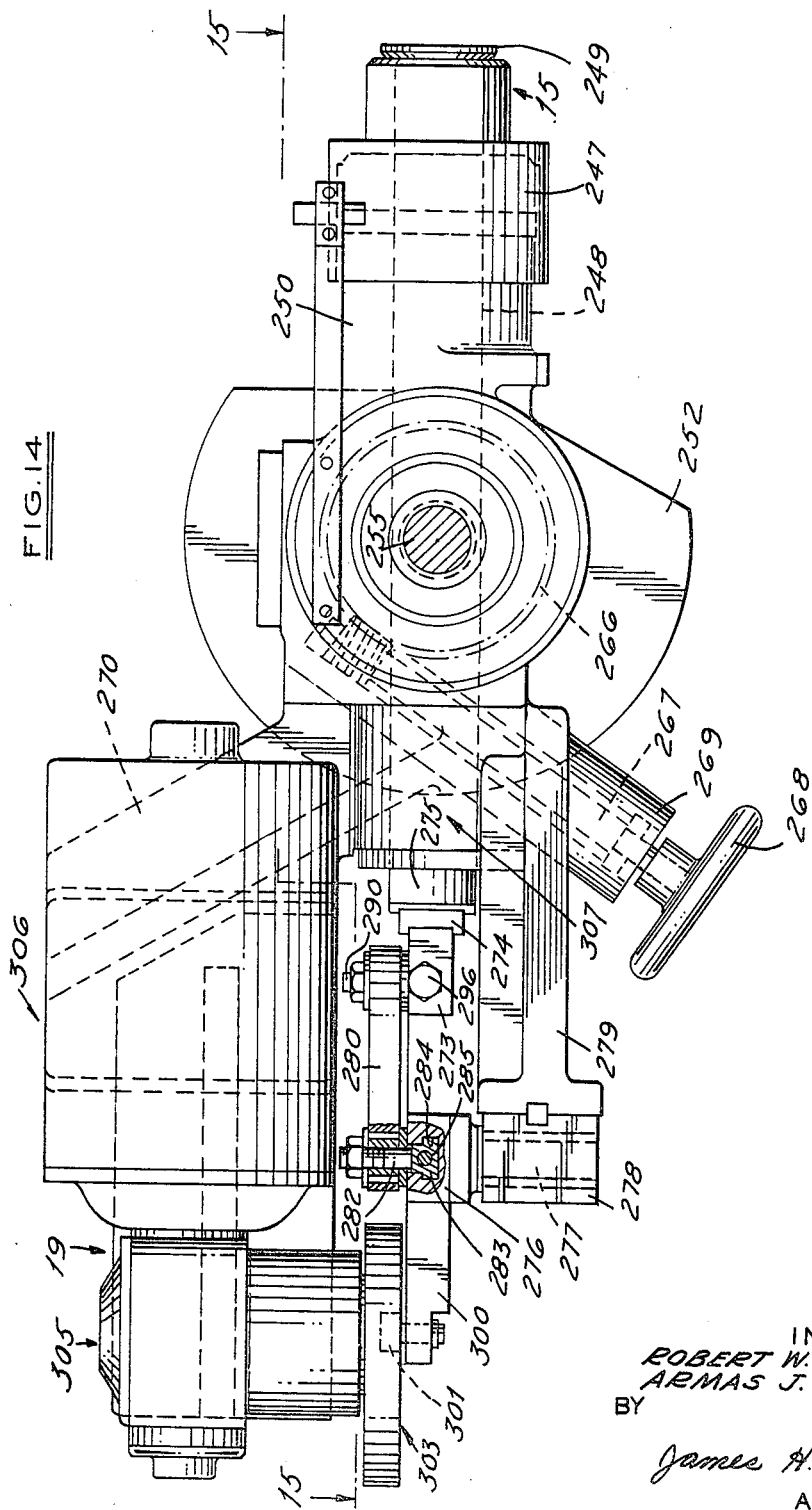
FIG. 14 is a fragmentary, enlarged, elevational view of the structure illustrated in FIG. 2, taken along the line 14—14 thereof, and looking in the direction of the arrows.

The angular adjustment of the spindle 248 is carried out by actuation of the handwheel 268, shown in FIG. 14. The handwheel 268 rotates the shaft 267 which carries a worm gear on its inner end for meshing engagement with a worm wheel 266 that is secured to the spindle housing 250. The shaft 267 is mounted in the housing 269 which is fixed to the bracket 270 that is secured to the horizontal slide 254.

The reciprocating drive assembly 19 provides the ability to control the contour of the bearing surface being honed. The drive assembly 19 includes means for adjusting the stroke of the spindle 248 so that a wide range of parts may be honed which require various stroke lengths.

The length of stroke of the spindle 248 is provided by and controlled by a parallel linkage means which includes the pair of drive bars or links 273 and 276, as shown in FIG. 15. The bar 273 is fixed at a central point thereon to the block 274 by any suitable means. The block 274 is fixed to the rear end 275 of the spindle 248. As best seen in FIG. 14, the front end of the bar 276 is pivotally mounted by the fulcrum shaft 277 in a fulcrum journal 278 that is fixed to the bracket 279 which is secured to the spindle housing 250.

As seen in FIGS. 14 and 15, the parallel bars 273 and 276 are connected by a transverse bar or link 280 which is provided with a plurality of bolt holes as 281 for securing the link 280 to the parallel bars 273 and 276 in various relationships. As best seen in FIG. 14, the left end of the bar 280 is connected to the parallel bar 276 by a screw 282 having an integral T-shaped head 283. The T-shaped head 283 is slidably mounted in a T-shaped slot 284 which is formed lengthwise in the bar 276. An elongated, threaded adjusting screw or shaft 285 is mounted in the slot 284 and is meshably engaged with the T-shaped head 283. The rear end of the shaft 285 is journaled in the journal p'ate 286 which is mounted on the rear end of the bar 276 by the screws 287. The front end of the shaft 285 is journaled at the point 288. The shaft 285 is provided with an enlarged nut-shaped head 289 on the front end thereof for adjustment of the shaft by means of a suitable tool.

As shown in FIG. 15, the bar 273 is also provided with an adjusting shaft 291 which is similar to shaft 285. The shaft 291 engages the lower end of the screw 290 in the same manner as the shaft 285 engages the head of the screw 282. The bar 273 includes a T-shaped slot 292 in which the shaft 291 is disposed. The rear end of the shaft 291 is journaled in the plate 293 which is secured to the bar 273 by the screws 294. The front end of the shaft 291 is journaled at the point 295. The shaft 291 is provided with an adjustment nut head 296 on the front end thereof.

As shown in FIG. 15, the bar 276 is provided with an operating lever 300 for actuating the aforedescribed parallel linkage, stroke control structure. The lever 300 is connected to the bar 276 adjacent the fulcrum shaft 277. A cam follower in the form of a cam roller 301 is operatively mounted on the outer end of the lever 300. The cam roller 301 is rollably mounted in the cam track 302 which is formed on the lower face of the circular cam 303. The cam 303 is attached to the output shaft 304 of a cam reducer 305 (FIG. 4). As shown in FIGS. 4 and 14, the gear reducer 305 is driven by a suitable electric motor 306 which is mounted on a bracket 307 carried by the spindle housing 250.

It will be understood that the length of the stroke that is applied to the tool holder assembly is controlled by the position of the link 280 relative to the bars 273 and 276. The bars 273 and 276 may be provided with index marks on the upper faces thereof for aid in setting the link 280 to a desired position. The cam 303 controls the speed of the stroke. The illustrated cam has a 2.500 inch maximum cam rise and a 1.500 minimum cam rise, with a ten degree dwell on each side of center on each end of stroke, which provides a 20° total dwell. The controlling of the dwell controls stone wear and contour control. In other words, the longer the dwell period at each end of stroke, the more stock is removed from the surface at the end portions of the bearing, since the bearing is being rotated at certain specified revolutions to accommodate for the contour control specified. Since there is no dwell at the middle portion of the bearing surface, there consequently is not much stock removal. It is therefore evident that more stock is removed nearer the end portions becaluse of the dwell period that is put in by the use of the cam 303, linkages 280, 273, and 276. The gear reducer 305 may be of any suitable type, as for example, a ⅓ horsepower, 1800 r.p.m. motorized reducer.

Figure 5:
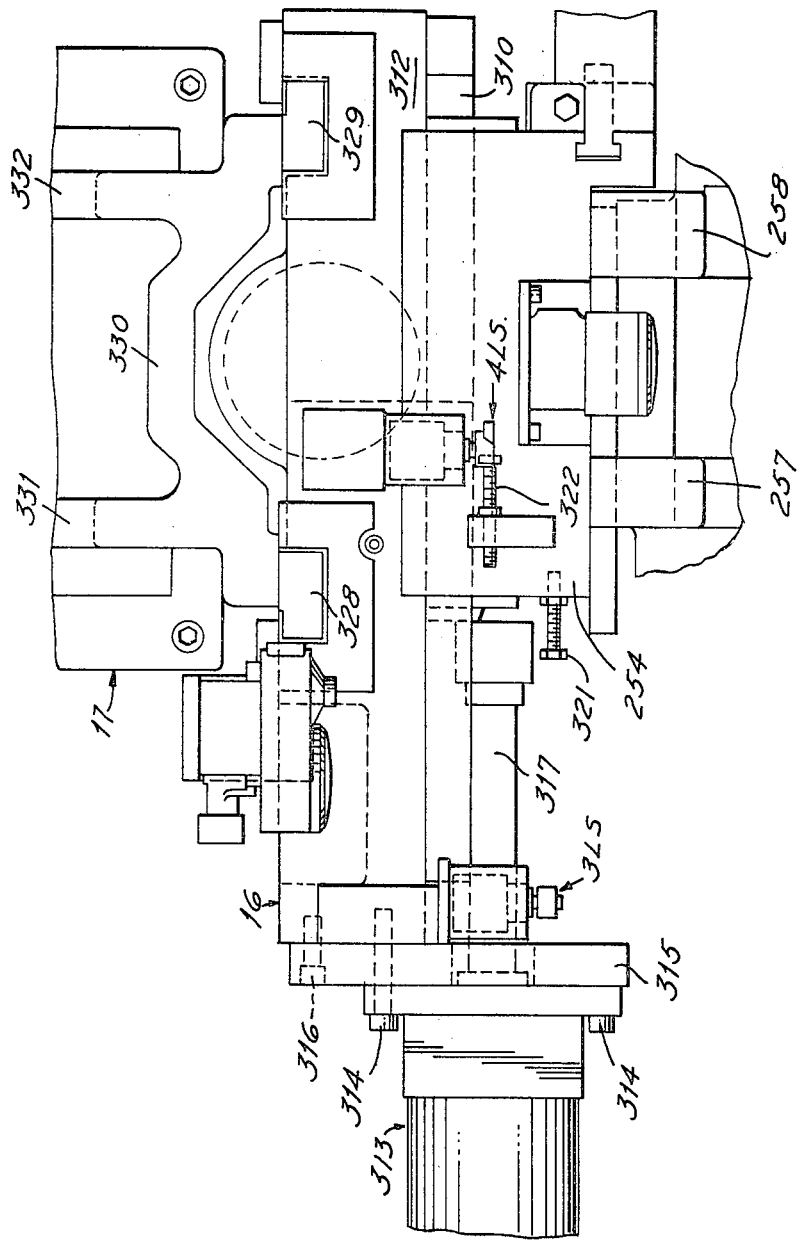
FIG. 5 is a fragmentary, slightly enlarged, top plan view of the structure illustrated in FIG. 4, taken along the line 5—5 thereof, and looking in the direction of the arrows.

As shown in FIG. 2, the horizontal slide 254 is slidably mounted on the vertically spaced flat ways 310 and 311 carried on the front side of the vertical slide 312. As shown in FIG. 5, an air cylinder 313 is provided for moving the horizontal slide 254 forwardly and backwardly. The cylinder 313 is connected by the screws 314 to the mounting plate 315. The plate 315 is connected to the vertical slide 312 by the screws 316. The cylinder rod 317 is connected to the horizontal slide 254. As shown in FIG. 18, the cylinder 313 is connected by the air lines 318 and 319, the valve 320 and the line 199 to the other illustrated air supply line that connects to the air supply.

As shown in FIG. 4, the horizontal slide 254 carries a pair of limit switch actuators 321 and 322 for operating the limit switches 3LS and 4LS which control the flow of air to the cylinder 313. As shown in FIG. 2, the horizontal slide 254 is adapted to be clamped to the vertical slide 312 by the clamp block 327 which is operated by the clamp screw 326 and the clamp crank 325.

As best seen in FIGS. 4 and 5, the vertical slide 312 is slidably mounted on the vertical flat ways 328 and 329 which are mounted on the front side of the column 17. As shown in FIG. 5, the column 17 includes the front vertical wall 330 and the integral side walls or plates 331 and 332.

As shown in FIG. 2, the vertical slide 312 is moved upwardly and downwardly on the ways 328 and 329 by a screw jack. The screw jack includes the vertical jack screw 333 which is threaded through a suitable nut secured to the slide 312. The lower end of the screw 333 is mounted in the housing 334. A worm gear drive means 335 operatively connects the lower end of the jack screw 333 with the rotatable shaft 336. The shaft 336 is manually rotatable by the handwheel 337 which is disposed on the outer side of the housing wall 340. The shaft 336 is rotatably mounted in the bushings 338 which are carried in the housing walls 339. As best seen in FIG. 4, the jack screw 333 may be covered by a suitable, flexible covering as 341. The housing 18 includes a coolant trough 342 on the upper side thereof to catch coolant used during a honing operation.

OPERATION

Figure 17A:
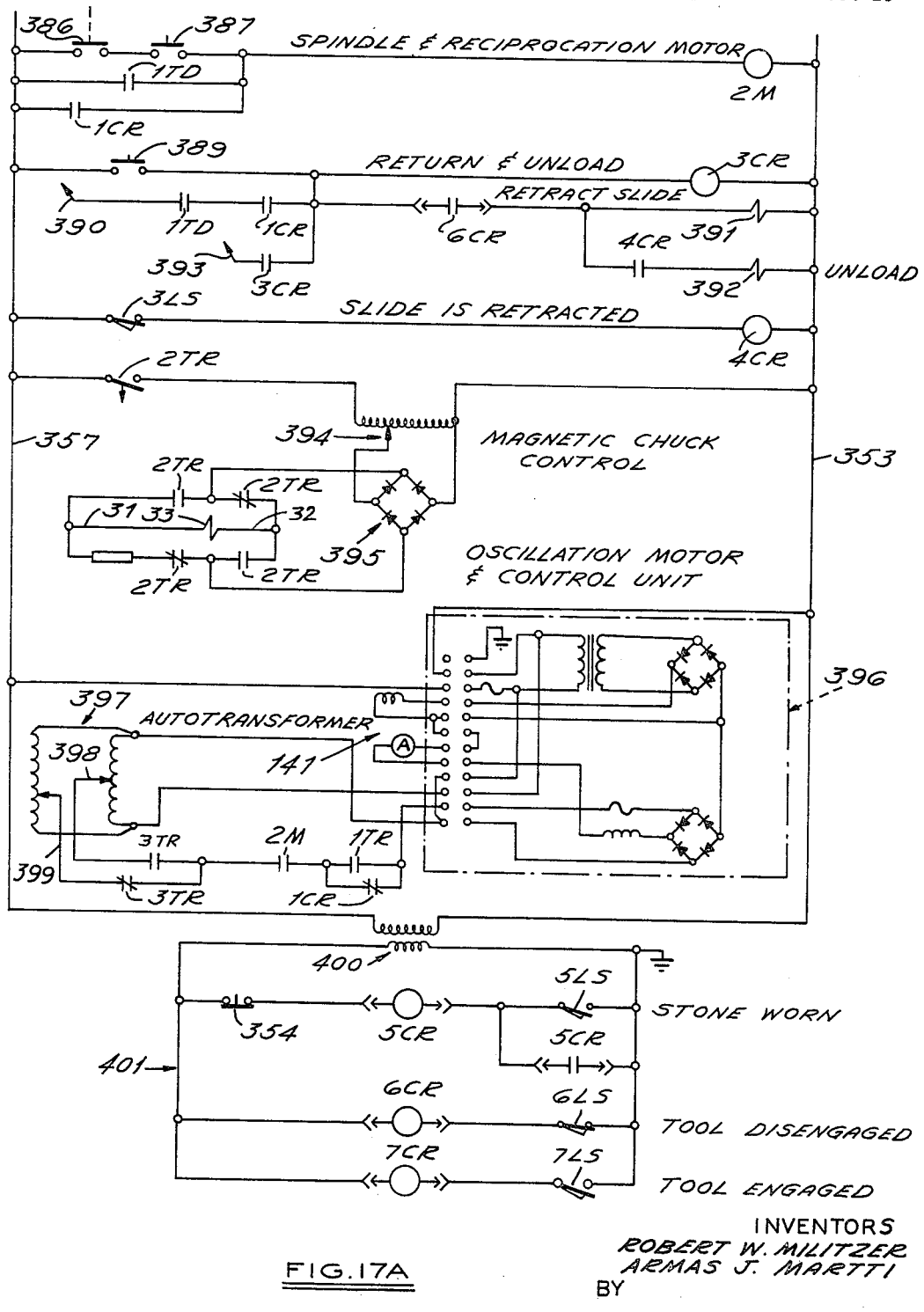

FIGS. 17 and 17A show an illustrative electrical control circuit adapted for automatic operation of the honing machine of the present invention. However, it will be understood that any suitable electric control circuit may be used. The first half of the illustrative control circuit is shown in FIG. 17, and the second half is shown in FIG. 17A.

In FIG. 17, the numeral 347 indicates a suitable power source adapted to be connected by the main switch 348 to the illustrative control circuit. When the switch 348 is closed the conductors 349 and 350 connect the primary coil of the transformer 351 to the power source 347. The secondary coil of the transformer 351 is connected to the control circuit conductors 352 and 353 which conduct power to the master start and reset switch 354. The reference numeral 358 indicates the master stop switch.

The machine is set up for automatic operation by setting the selector switch 368, 380, 386 to "automatic." The master start and reset switch 354 is then operated to energize the coolant pump motor 175 and the magnetic separator 360. The operation of the master switch 354 energizes the conductors 356 and 357, the low voltage coil 400, and the control circuit is ready for operation. The cycle start switch 369 is next operated to energize 1CR to initiate an automatic cycle and light the light 371. Normally open relay 1CR completes the circuit to solenoid 374 of FIG. 17 which is the solenoid in FIG. 18 marked 1 Sol. This solenoid operates the valve 150 to admit air under pressure to the oscillating rotary motor 141 and the load chute cylinder 102. Normally open relay 1CR also releases limit switch 372 (1LS) and operates limit switch 2LS which operates when the dial loader 125 is in the hone position. The limit switch 2LS energizes solenoid 377 (2 sol) which operates the valve 320 (FIG. 18) to admit air under pressure to the slide cylinder 313 to advance the horizontal slide 254. Limit switch 3LS (FIGS. 18 and 17A) is released and limit switch 4LS is operated to open the feed valve 198 to admit air under pressure to the tool feed cylinder 186. Limit switch 4LS picks up relay 1TR to complete the circuit to relay 2TR, and 3 sol (379) which operates valve 242 to admit air under pressure to the tool engagement cylinder 187 to move the tool into engagement with the workpiece 14.

Limit switch 7LS in the low voltage circuit 401 is operated as the tool engages the workpiece surface 146. The limit switch 7LS is operated by engagement with the switch operating arm 229.

The next step in the operation is the magnetizing of the chuck 11. 2TR energizes the chuck control automatic transformer 394 which energizes the chuck coil 33 through the rectifier 395. 7CR completes the circuit to the fast reciprocation timer 1TD, the tool feed cylinder solenoid 383 (4 sol, FIG. 18) and 3TR, the slow reciprocation timer. The solenoid coil 382 is energized at this time. The fast reciprocation timer 1TD picks up the spindle and reciprocation motors 306 and 61. Honing at fast oscillation continues until the fast reciprocation timer 1TD times out.

When the fast reciprocation timer 1TD times out, it drops the slow reciprocation timer 3TR thereby slowing the reciprocations until the slow reciprocation timer 3TR times out, thereby de-energizing 1TR, 2TR and solenoid 379 (3 sol). 1TR de-energizes 1TD whereby the spindle motor 306 and the reciprocation motor 61 is stopped. Solenoid 383 (4 sol) is de-energized blocking feed pressure to the tool feed cylinder 186. 2TR removes power to the chuck control thereby demagnetizing the chuck 11. Solenoid 379 (3 sol) is de-energized and the valve 242 is de-energized thereby operating the tool engagement cylinder 187 to disengage the tool operating limit switch 6LS.

6CR energizes solenoid 391 (5 sol) which operates the valve 320 to operate the cylinder 313 to retract the slide thereby releasing 4LS (FIG. 18). Limit switch 3LS is operated when the slide cylinder 313 is operated during a retracting of the horizontal slide 254. When the slide 254 is retracted, the operation of limit switch 3LS also energizes the relay 4CR which energizes the unload solenoid 392 (6 sol), FIG. 18, to shift the valve 150 and energize the oscillating motor 141 to unload the workpiece 14 from the dial loader 125. As the workpiece 14 is unloaded from the dial loader 125, the switch 378 is released. When the dial loader 125 reaches the unload position opposite the unload chute, switch 372 (1LS) is operated completing the circuit to 2CR to start another cycle.

If the workpiece 14 is not loaded at the start of a cycle, there will be no back pressure to operate switch 378 and the slide 254 will advance, operating limit switch 4LS and lighting the "No part" light 375. Depressing the return and unload switch 367, 389 will return the dial loader 125 and the slide 254 to the load position and de-energize the "No part" light 375. With workpieces 14 in the load chute, a new cycle may be resumed by pressing the cycle start switch 369.

When the honing stones 192 are worn, limit switch 5LS will operate and de-energize 5CR and energize the checkstones light 366. To reset the checkstones, press the master start and reset button 354. Limit switch 370 (8LS) is operated by the workpiece 14 in the load chute.

The load switch 373 performs the following sequence of functions and is operative only when the cycle selector switch 368 is in the set-up position. First, pressing the load switch 373 momentarily with the dial loader 125 in the unload position will rotate the dial loader 125 into the honing position. Also, with the workpiece 14 located in the honing position, pressing of the load switch 373 will engage the stone 192 against the raceway surface 146 of the workpiece 14. If the load button 373 is held in a depressed or closed position, the above described functions will be performed in a continuous sequence.

The hone switch 381 is operative only when the cycle selector switch 368 is turned to the set-up position and the tool 192 is engaged with the bearing surface 146. Depressing this button or switch will initiate a single honing cycle. After honing a single part, the machine will stop.

The jog motor switch 387 is operative only when the cycle selector switch 368 is in the set-up position. It starts the spindle and tool oscillation motors 306 and 61. These motors will run only as long as the jog button or switch 387 is held depressed. The numeral 396 generally indicates the oscillation motor and control unit and the numeral 397 generally indicates the auto transformer operatively connected therewith. The numerals 398 and 399 indicate the fast oscillation control and the slow oscillation control, respectively, of the auto transformer 397.

Depressing of the low level lubrication check switch 362 energizes the lubrication check light 361. Numeral 364 indicates a lubrication timer switch for energizing the timer 363 and the solenoid 365 for operating a lubrication supply valve.

In FIG. 17, the reference numerals 390 and 393 indicate that those conductors are connected to the conductors in FIG. 17A having the same reference numerals.

The non-gripping means for maintaining the axial position of a workpiece on the rotating means include the electromagnetic chuck means 11, pressure roller drive means, and the like.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. A honing machine comprising:
   (a) means for rotating a workpiece having an annular surface;
   (b) means for locating the workpiece on said means for rotating the workpiece;
   (c) a tool holder assembly carrying an abrading member adjacent the workpiece for honing engagement of the abrading member with the annular surface for honing said surface; and
   (d) means attached to said tool holder assembly for reciprocating the tool holder assembly to reciprocate the abrading member a controlled length of stroke over and on a path parallel to said surface and under controlled speed variations during each stroke;
   (e) said means for reciprocating the tool holder assembly comprises a reciprocating shaft connected at one end thereof to the tool holder assembly for moving the abrading member across the annular surface; and
   (f) said reciprocating shaft is pivotally mounted on a housing on a movable slide assembly.

2. A honing machine as defined in claim 1, wherein:
   (a) said means for reciprocating the tool holder assembly includes means attached to the reciprocating shaft for controlling the length of stroke of the tool holder assembly.

3. A honing machine as defined in claim 2, wherein:
   (a) said means for reciprocating the tool holder assembly includes means attached to the length of stroke control means for controlling the speed and direction of movement of the tool holder assembly during each stroke thereof.

4. A honing machine as defined in claim 3, wherein:
   (a) said means for reciprocating the tool holder assembly includes power means for operating said means for controlling the speed and direction of movement of the tool holder assembly.

5. A honing machine as defined in claim 2, wherein:
   (a) said means for controlling the length of stroke of the tool holder assembly comprises a parallel linkage means.

6. A honing machine as defined in claim 5, wherein said parallel linkage means comprises:
   (a) a first elongated link disposed transversely to the longitudinal axis of said reciprocating shaft and being fixed to the other end of said shaft;
   (b) a second elongated link disposed transversely to the longitudinal axis of said reciprocating shaft in a position spaced apart from said first elongated link;
   (c) a connecting link adjustably mounted between said first and second elongated links for adjustment to various positions along said elongated lengths to control the length of stroke of the reciprocating shaft;
   (d) one end of said second link being pivotally mounted on the reciprocating shaft housing; and
   (e) an operating lever operating connecting said second link with said stroke speed and direction of movement control means .

7. A honing machine as defined in claim 3, wherein said means for controlling the speed and direction of movement of the tool holder assembly during each stroke comprises:
   (a) cam means interconnected between said power means and said means for controlling the length of stroke of the tool holder assembly.

8. A honing machine as defined in claim 7, wherein said cam means comprises:
   (a) a rotary cam; and
   (b) a cam follower attached to said length of stroke controlling means and engaged by said rotary cam for operating said length of stroke controlling means.

9. A honing machine as defined in claim 8, wherein said means for reciprocating the tool holder assembly includes:
   (a) speed reducer means connected to said rotary cam for rotating the same; and
   (b) motor means connected to said speed reducer means.

10. A honing machine as defined in claim 1, wherein said movable slide assembly comprises a compound assembly having:
    (a) a vertical column;
    (b) a vertical slide mounted on said vertical column for vertical movement thereon;
    (c) means for moving said vertical slide on said vertical column;
    (d) a horizontal slide mounted on said vertical slide for horizontal movement thereon;
    (e) means for moving said horizontal slide on said vertical slide; and
    (f) said horizontal slide carrying said reciprocating shaft housing.

11. A honing machine as defined in claim 1, wherein:
    (a) said means for rotating the workpiece includes a means for maintaining the workpiece in axial position during rotation thereof;
    (b) said means for locating the workpiece on the means for rotating the workpiece includes a guide means engageable with a surface opposed to the annular surface for maintaining the workpiece in radial position during rotation of the workpiece and a honing operation on said annular surface;
    (c) load chute means disposed adjacent said means for rotating the workpiece;
    (d) movable workpiece transfer means for receiving a workpiece from said load means and locating it on said means for maintaining the workpiece in axial position;
    (e) unload chute means for unloading a workpiece from said movable transfer means; and,
    (f) wherein said movable transfer means includes:
      (1) a rotatable member rotatably mounted adjacent said workpiece rotating means;
      (2) a workpiece carrier on said rotatable member and provided with a workpiece receiving slot; and,
      (3) means for rotating said rotatable member to move said workpiece carrier from a workpiece honing position adjacent said axial position maintaining means to a position adjacent said unload chute to discharge a workpiece, and thence to move said workpiece carrier back to said honing position past said load chute to pick up another workpiece and move it to the honing position for engagement of the workpiece by said guide means.

12. A taper honing machine as defined in claim 11, wherein:
   (a) said load chute means and unload chute means are adjustable for handling workpieces of various sizes.

13. A honing machine comprising:
   (a) rotatable means maintaining a workpiece having an annular surface in axial position during rotation of the workpiece;
   (b) means for rotating said workpiece axial position maintaining means;
   (c) means for locating the workpiece on said axial position maintaining means for rotating the workpiece;
   (d) a tool feed fluid cylinder carrying an abrading member adjacent the workpiece for honing engagement of the abrading member with the workpiece annular surface for honing said surface;
   (e) a tool engagement fluid cylinder carrying said tool feed fluid cylinder for moving said tool feed fluid cylinder toward and away from the workpiece annular surface;
   (f) a compound slide assembly including a vertically movable slide and a horizontally movable slide;
   (g) a housing on said horizontally movable slide;
   (h) a reciprocating shaft carried on said housing and having said tool engagement fluid cylinder mounted on one end thereof;
   (i) means connected to the other end of said reciprocating shaft for controlling the length of stroke of the abrading member;
   (j) means connected to the length of stroke controlling means for controlling the speed and direction of movement of said abrading member; and,
   (k) power means for operating said means for controlling the speed and direction of movement controlling means.

14. A honing machine as defined in claim 13, wherein:
   (a) said reciprocating shaft is pivotally mounted on said housing on said horizontally movable slide.

15. A honing machine as defined in claim 13, wherein:
   (a) said means for controlling the length of stroke of the abrading member comprises an adjustable parallel linkage means.

16. A honing machine as defined in claim 15, wherein:
   (a) said means for controlling the speed and direction of movement of said abrading member comprises a rotatable cam means.

17. A honing machine as defined in claim 16, wherein:
   (a) said power means comprises a speed reducer means driven by a motor means.

18. A honing machine as defined in claim 13, wherein said means for locating the workpiece on said workpiece axial position maintaining means comprises:
   (a) a rotatable member rotatably mounted adjacent said workpiece rotating means;
   (b) a workpiece carrier on said rotation member and provided with a workpiece receiving slot:
   (c) a guide means engageable with a surface opposed to the annular surface for maintaining the workpiece in radial position during rotation of the workpiece and a honing operation on said annular surface; and,
   (d) means for rotating said rotatable member to move said workpiece carrier from a workpiece honing position adjacent said workpiece axial position maintaining means to a position adjacent said unload chute to discharge a workpiece, and thence to move the workpiece carrier back to said honing position past said load chute to pick up another workpiece and move it to the honing position for engagement of the workpiece by said guide means.

19. A honing machine as defined in claim 18, including:
   (a) means for forcing fluid between the guide means and the workpiece to form a supporting film between the guide means and the workpiece during a honing operation.

20. A honing machine as defined in claim 13, wherein:
   (a) said means for maintaining the axial position of a workpiece comprises an electromagnetic means.

References Cited
UNITED STATES PATENTS

| | | | |
|---|---|---|---|
| 3,023,552 | 3/1962 | Grobey et al. | 51—236 |
| 2,960,342 | 11/1960 | Raper | 279—2 |
| 3,048,416 | 8/1962 | Rogers | 279—2 |
| 2,924,917 | 2/1960 | Rice | 51—237 |
| 3,067,547 | 12/1962 | Peden et al. | 51—291 X |
| 2,621,448 | 12/1952 | MacMeans et al. | 51—67 |
| 3,315,416 | 4/1967 | Healy | 51—236 X |

JAMES L. JONES, Jr., Primary Examiner

U.S. Cl. X.R.

51—89, 267